United States Patent [19]

Alm et al.

[11] Patent Number: 4,795,764

[45] Date of Patent: Jan. 3, 1989

[54] POLY(OXYALKYLENE) POLY(ALIPHATIC ISOCYANATE) PREPOLYMER AND POLYUREA POLYMER DERIVED THEREFROM BY REACTION WITH POLYAMINE

[75] Inventors: Roger R. Alm, Lake Elmo; Irvin F. Dunsmore, Ham Lake; Richard M. Stern, Woodbury, all of Minn.

[73] Assignee: Minnesota Mining & Manufacturing Company, St. Paul, Minn.

[21] Appl. No.: 56,593

[22] Filed: Jun. 1, 1987

[51] Int. Cl.$^4$ .............................................. C08G 18/10
[52] U.S. Cl. ................................... 521/107; 521/116; 521/121; 521/125; 521/129; 523/102; 523/103; 523/129; 523/130; 523/131; 523/132; 528/56; 528/76; 528/77
[58] Field of Search .............. 521/107, 116, 121, 125, 521/129, 159; 252/182, 3; 524/650, 873; 523/102, 103, 129, 130, 131, 132; 528/56, 76, 77

[56] References Cited

U.S. PATENT DOCUMENTS

| | | | |
|---|---|---|---|
| 3,330,782 | 7/1967 | Poppelsdorf | 260/2.5 |
| 3,562,156 | 2/1971 | Francen | 252/8.05 |
| 3,655,627 | 4/1972 | Hutzler et al. | 260/77.5 |
| 3,719,050 | 3/1973 | Asao et al. | 61/36 R |
| 3,772,195 | 11/1973 | Francen | 252/8.05 |
| 3,805,531 | 4/1974 | Kistner | 61/36 R |
| 3,805,532 | 4/1974 | Kistner | 61/36 R |
| 3,894,131 | 7/1975 | Speech | 264/45.2 |
| 3,985,688 | 10/1976 | Speech | 260/2.5 |
| 4,118,354 | 10/1978 | Harada et al. | 260/29.2 |
| 4,149,599 | 4/1979 | Chiesa, Jr. | 169/47 |
| 4,237,182 | 12/1980 | Fulmer et al. | 428/310 |
| 4,303,534 | 12/1981 | Hisamoto et al. | 252/3 |
| 4,315,703 | 2/1982 | Gasper | 405/264 |
| 4,359,096 | 11/1982 | Berger | 169/44 |
| 4,379,763 | 4/1983 | Clemens et al. | 252/628 |
| 4,476,276 | 10/1984 | Gasper | 524/500 |

FOREIGN PATENT DOCUMENTS

| | | |
|---|---|---|
| 73863 | 3/1983 | European Pat. Off. . |
| 206548 | 12/1986 | European Pat. Off. . |
| 2817203 | 3/1987 | Fed. Rep. of Germany . |
| 1489052 | 8/1986 | United Kingdom . |

OTHER PUBLICATIONS

National Geographic Magazine, Mar. 1985, pp. 318-351.
"In the Dumps", The Wall Street Journal, May 16, 1985, pp. 1, 16.
Consulting Engineer, Mar. 1984, pp. 35-47.
3M Bulletin 98-0211-2614-3 (471.5) 11 (3-87).
3M Bulletin 98-0211-2615-0 (472) 11 (3-87).
Journal of American Chemical Society, 49, pp. 3181-3188 (1927).
Encyclopedia of Chemical Technology, Kirk-Othmer, 2nd Ed., vol. 12, pp. 46, 47, Interscience Pub. (1967).
"Foams", J. J. Bikerman, Springer-Verlag, New York, Inc., pp. 108-132 (1973).
Encyclopedia of Chemical Technology, Kirk-Othmer, 3rd Ed., vol. 22, pp. 347-387, John Wiley & Sons (1983).
3M Bulletin Y-FATCB(311) BE issued Feb. 1981.
NFPA-11-1983 Standard of the National Fire Protection Association, Inc.; "Low Expansion Foam & Combined Agent Systems".
3M Bulletin Y-FGB3(83.5)II issued Apr. 1, 1978.
Ansul Company Bulletin F-81105 (1981).
Angus Fire Armour Corporation Bulletin PAM 4/84-5M.
National Foam System, Inc. Bulletin 68040 (1980).
Encyclopedia of Chemical Technology, Kirk-Othmer, 3rd Ed., vol. 23, pp. 576-579, John Wiley & Sons (1983).
Bulletin PDB #1 of Kelco Company.

Primary Examiner—Maurice J. Welsh
Attorney, Agent, or Firm—Donald M. Sell; William G. Ewert

[57] ABSTRACT

Air is mechanically entrained in an aqueous solution of surfactant, polyamine reactant, and low moisture sensitive poly(oxyalkylene) poly(aliphatic isocyanate) prepolymer the poly(oxyalkylene) portion of which contains sufficient oxyethylene units to render the prepolymer water-soluble and hydrophilic, to form a fluid, water-based, air foam which is sprayed or otherwise applied to exposed surface of a substrate, such as a body of hazardous material, the applied foam gelling or increasing in viscosity, due to reaction of the polyisocyanate prepolymer with the polyamine in the presence of the water to form a poly(oxyalkylene) polyurea polymer containing polyurylene-containing segments formed from the reaction, and forming a persistent gelled air foam or viscous air foam in the form of a coating on the exposed surface, thus sealing or otherwise protecting or controlling the substrate.

39 Claims, No Drawings

POLY(OXYALKYLENE) POLY(ALIPHATIC ISOCYANATE) PREPOLYMER AND POLYUREA POLYMER DERIVED THEREFROM BY REACTION WITH POLYAMINE

This invention relates to poly(oxyalkylene) poly(aliphatic isocyanate) prepolymer, polyurea polymer derived from said prepolymer and polyamine reacted therewith, and methods of preparing said prepolymer and said polyurea polymer. In another aspect, it relates to water-containing or water-based composition comprising said polyurea polymer such as gelled air foams, viscous, non-gelled air foams, aqueous gelled solutions and viscous, non-gelled aqueous solution. In another aspect, it relates to the treatment of hazardous materials and other substrates such as those in hazardous waste sites and spilled or escaping from storage or transportation facilities. In another aspect, it relates to foams such as water-based foams and their use in such treatment. In another aspect, it relates to aqueous foam-forming liquids and film-forming foams made therefrom and used in the control of vapors or extinguishing of fires of flammable liquids. In another aspect, it relates to the use of said prepolymers and said polyurea polymer compositions made therefrom to consolidate aggregates or seal substrates.

During recent years, the threat of hazardous wastes, hazardous spills, leaks, and accidents of flammable liquids, and other hazardous materials to public health and safety and to the environment has received increasing attention and raised national concerns and issues which are being addressed by a host of local ordinances and state and federal laws and regulations. Some of the hazardous waste sites have even been called "deadly" and "screaming emergencies". See *National Geographic Magazine*, March 1985, pages 318–351 and "In the Dumps", *The Wall Street Journal*, May 16, 1985, pages 1, 16. Various technologies have been used or proposed for the treatment or control of such materials. See, for example, *Consulting Engineer*, March, 1984, pages 35–47.

There are thousands of hazardous waste sites in the United States, such as impoundments, burial dump sites, and landfills in which wastes from industrial and commercial operations, research and retail establishments, educational and hospital laboratories, and military complexes have been stored or disposed. Such sites are either still operating, inactive, or abandoned and the emission or release of gases, vapors, odors, liquids, and dust from such sites and their pollution of the air and surface or ground water and contamination of soil are uncontrolled or are controlled or managed by various techniques many of which have disadvantages which limit their applicability.

An example of a particularly serious hazardous waste dump is the McColl Dump in Orange County, Calif., an abandoned World War II dump containing acid petroleum sludges, oil field drilling muds, waste hydrocarbons, sulfur dioxide, and benzene, which dump is in close proximity to a residential area of more than 800 homes. A cleanup solution proposed for that site is excavation of the hazardous waste material by workers in protective clothing and hauling by trucks of the excavated material elsewhere, with the possible evacuation of people from the neighborhood if emissions of gases and odors cannot be controlled.

A significant advance in the treatment of hazardous material is that described in European Patent Application, EP No. 206548A, published Dec. 30, 1986. That application, hereinafter referred to as Kent et al, discloses aerating an aqueous solution of surfactant and poly(oxyalkylene)isocyanate prepolymer, prepared from polyether polyols and aliphatic or, preferably, aromatic polyisocyanates, to form a fluid, water-based air foam which is sprayed or otherwise applied to the exposed surface of a substrate, such as a body of hazardous material, the applied foam gelling or increasing in viscosity, due to the reaction of the isocyanate prepolymer with water, to form a poly(oxyalkylene) polyurea polymer, and forming a persistent, gelled air foam or viscous air foam in the form of a coating on the exposed surface, thus sealing or otherwise protecting or controlling the substrate. In the event that the prepolymer's reaction with water is slower than desired, the reaction time can be shortened by adding minor amounts of a catalyst such as a tertiary amine, e.g. triethylamine, or the gelation or thickening process can be accelerated by adding a minor amount of water-soluble, reactive polyamine, e.g. diethylenetriamine.

Commercial foam stabilizing products, e.g. 3M Foam Stabilizer FX-9161 in combination with 3M Foam Concentrate FX-9162, of the type described by Kent et al. for suppressing a wide variety of flammable liquids, dusts, odors, solid particulates, ordinary combustible materials, etc., are described in product bulletins of the 3M Company, viz., bulletins 98-0211-2614-3 (471.5) 11 and 98-0211-2615-0 (472) 11 issued March, 1987.

Prior art references relating to isocyanate prepolymers are described in Kent et al. and other such prior art is U.S. Pat. No. 3,655,627 (Hutzler et al.), German Offenlegungsschrift No. 2817203, and British Patent Specification No. 1 489 052.

There is a host of man-made water-bearing or -holding structures, such as sewer lines, made of materials such as siliceous materials, e.g. concrete, which inherently have, or develop with time, various discontinuities, such as openings, cracks, fissures, joints, or the like which provide an entry or pathway for the undesirable ingress or egress of water into or from such structures. A host of polyoxyethylene isocyanate-terminated urethane prepolymer sealing compositions and sealing techniques have been used or proposed to prevent the ingress or egress of such water, e.g. see U.S. Pat. Nos. 3,894,131 (Speech) and 4,315,703 (Gasper). Polyoxyethylene isocyanate-terminated urethane prepolymers have also been proposed for the treatment of mineral aggregate, such as soil or sand, to overcome problems arising from the inherent inconsolidated or poorly consolidated nature of aggregate and form consolidated structures which are load-bearing or water-impermeable, this art usually being referred to as soil stabilization—see, for example, U.S. Pat. No. 3,805,531 (Kistner). And such prepolymers have also been proposed for use in consolidation of aggregate material for agricultural purposes to form an integral, water-permeable mass, e.g. in the nursery practice of potting plants or seeds—see, for example, U.S. Pat. No. 3,805,532 (Kistner). While said prepolymers are generally useful for these various purposes of sealing and consolidation, there is a need in many instances for more versatile prepolymer reaction systems which react more quickly or give a wider range of properties in the polymers formed.

Briefly, this invention, in one aspect, provides a low moisture sensitive poly(oxyalkylene) poly(aliphatic isocyanate) polymer, the poly(oxyalkylene) portion of which contains sufficient oxyethylene units, —$CH_2CH_2O$—, to render the polymer water-soluble and hydrophilic, the chains of the polymer terminating in the isocyanate moieties. Such polymer, for purposes of brevity, is referred to hereinafter on occasion as an isocyanate-terminated prepolymer or simply as "prepolymer". In another aspect of this invention, the isocyanate moieties of the prepolymer react with water-soluble polyamine in the presence of water, as a solvent, to form, by means of an urylene-forming, addition polymerization, chain-extended or cross-linked, hydrophilic, water-swellable poly(oxyalkylene) polyurea polymer in which the residues of the prepolymer molecules are linked essentially by urylene linkages,

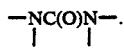

In another aspect of the invention, the polyurea polymer is prepared by mixing the prepolymer, optionally dissolved in an organic solvent which is water-soluble or water-dispersible and non-reactive (i.e., the solvent is free of active hydrogen atoms), with an aqueous solution of the polyamine. Or the prepolymer reactant for the reaction can be diluted with water (and then mixed with the aqueous polyamine) provided the resulting aqueous prepolymer does not stand too long before mixing with the polyamine and consequently lose isocyanate functionality due to the slow but eventual reaction of the water with the prepolymer, which prepolymer otherwise has said low moisture sensitivity. The "low moisture sensitivity" means that the prepolymer has low reactivity with moisture in air, e.g. a 70 weight percent solution of the prepolymer in CARBITOL ™ acetate exhibits essentially no increase, in viscosity after 24 hours of exposure in air at 22° C. and 30–50% R.H. Because of that low moisture sensitivity, the freshly prepared prepolymer per se, or even an organic solution is relatively stable for a while without significant reaction occuring between the isocyanate moieties of the prepolymer and adventitious moisture or water. This stability means the prepolymer can be stored in the field after preparation, even with intermittent exposure to air, with adequately prolonged shelf-life, e.g. several months, and that the field equipment used to handle or apply it, e.g. as a fluid foam to hazardous waste, need not be dried or specifically designed to ensure anhydrous conditions.

The polyurea polymer product can be in the form of non-cellular, water-based gel or aqueous gelled solution, or in the form of a viscous aqueous non-gelled solution, depending on the functionality of the precursor prepolymer and polyamine and the relative amounts and chemical structure of these two reactants. Alternatively, the polyurea polymer product can be in the form of water-based, aerated or air-entrained, closed cell, low density foam (or air foam), the foam as prepared being fluid and subsequently converted or stabilized in the form of either a non-fluid, gelled air foam or a viscous air foam. To make such foam, the aqueous solution of the polyamine reactant contains a surfactant as a foaming agent.

The fluid, water-based, aerated or air-entrained, closed cell, low density foam (or air foam) can be sprayed or otherwise applied as a wet, three-dimensional coating, blanket, or layer to exposed surface of a substrate, such as a body of hazardous material, for example a hazardous waste dump or a pool of a spilled, volatile, flammable liquid, the applied foam gelling, or increasing in viscosity without gelling, and thus stabilizing in situ and forming a wet, persistent or long-lasting, sealing or vapor suppressing, closed cell, hydrogel air foam, or a viscous, water-containing air foam, in the form of a coating, blanket, or layer on the substrate. Such a coating results in minimizing, suppressing, controlling, reducing or preventing the emission, spreading, or release of gases, vapors, odors, dusts, or liquids that may be present in the hazardous material or substrate and physically immobilizing, constraining, consolidating, sealing, or inactivating the exposed surface so coated. (The term "air foam" is used in its industry-accepted sense to mean a foam made by physically mixing air into a liquid, and thus the term is distinct from chemical or carbon dioxide foam or halocarbon blown foam.)

The foam as prepared and applied is initially a fluid, two phase-system (an agglomeration of air bubbles) of a discontinuous or dispersed gas phase, viz., air, and a continuous, aqueous, polymer liquid phase, viz., bubble walls or lamellae, comprising water in which is dissolved or dispersed small amounts of organic material, namely surfactant foaming agent and polyamine-reactive, prepolymer gelling or viscosity-increasing agent. The water of the liquid phase can also contain optional components, such as rubber or polymeric latex particles, pigments, dyes, etc. The liquid phase of the foam is the major or predominant phase by weight. Upon or following application of the fluid foam to the hazardous material or substrate, and as a consequence of the polymerization of the prepolymer as described above, the three-dimensional, closed cell structure of applied foam is thus stabilized in the form of either a non-fluid, gelled air foam or a viscous air foam. The gelled air foam is a two-phase system of discontinuous gas (air) phase and a continuous, soft, semi-solid hydrogel phase comprising bound water and water-insoluble polyurea polymer. The viscous air foam is a two-phase system of discontinuous gas (air) phase and continuous aqueous polymer phase comprising water and polyurea polymer. The polyurea polymer in both the gelled and viscous foams comprises a plurality of said poly(oxyalkylene) chains, the oxyethylene content being sufficient to render the polymer hydrophilic. The hydrogel or viscous phase is the major or predominant phase by weight. The lamellae or liquid film of the air bubbles in the applied fluid foam is gelled, or becomes viscous, thus minimizing, reducing, or preventing the drainage of liquid from the lamellae and the consequent rupture of the bubbles and collapse of the foam structure. Due to the hydrophilic nature of the polyurea polymer, water in the foam is retained or bound and it, together with the closed cell nature of the resulting gelled or viscous foam, provides a stable, persistent or long-lasting, sealing or vapor suppressing blanket or barrier on the exposed, treated surface of the hazardous material or substrate. Such a foam blanket excludes oxygen or air from the treated hazardous material, or lowers the vaporization rate of liquid in the hazardous material or substrate so treated, and greatly facilitates clean-up procedures such as excavation and hauling of excavated material by reducing the risk of ignition of flammable vapors, reducing the concentration of toxic vapors in the work area, and reducing the environmental impact of the hazardous material.

The fluid foam can be conveniently formed by mechanically or physically entraining or dispersing air in a fresh or just-prepared, low viscosity, aqueous solution of the surfactant, polyamine, and polyamine-reactive prepolymer, for example by pumping the solution to air-aspirating foam producing equipment and applying, for example by spraying, the resulting fluid, low density foam onto the hazardous material or substrate. The solution can be prepared at the time of application by bringing together two liquid streams from separate sources, one stream comprising water, reactive polyamine, and surfactant and the other stream in the form of a concentrate comprising the polyamine-reactive prepolymer dissolved in an anhydrous, water-soluble or -dispersible, non-reactive organic solvent.

Advantages of the treatment, control, or management of hazardous materials or substrates with foam in accordance with this invention include: the use of an inexpensive and readily available raw material, namely water, which can be tepid (as is often found in field conditions) and is either fresh water, brackish water, or sea water, which forms the bulk of the weight of the foam, and generally is the only inorganic material in the foam system of this invention; the use of surfactant foaming agents and polyamines, both of which are used in relatively small amounts and many types of which are commercially available; a prepolymer which has low moisture sensitivity, thus enabling the prepolymer to be stable upon storage and in field application equipment, and which can react practically instaneously with polyamine without requiring a catalyst to increase such reaction; a treatment which can use equipment that is not particularly energy intensive or expensive and is conventional or easily modified conventional equipment, namely, pumps, valves, regulators, mixers, tanks, hoses, and foam-generating nozzles, etc., the operation of which can be carried out without specialized labor; the fact that the gelled foam is tough; the fact that the gelled foam can be quickly formed from the fluid foam, which is particularly meaningful when the fluid foam is applied to a vertical or inclined surface; the fact that the gelled or viscous foam does not significantly increase the weight and volume of the hazardous material or substrate to which it is applied, that is, there is a high substrate-to-foam weight or volume ratio; and the facts that the gelled or viscous foam is conformable and adheres to many types of substrates, is relatively innocuous, noncorrosive, nonflammable, relatively stable and persistent or long-lasting, inherently white or light-colored and can be dyed (thus the extent of application is visually perceptible), does not require high application temperatures or drying, and rapidly covers, traps, immobilizes, restrains, or consolidates the hazardous material or substrate, and is quickly effective as a control measure. (Many of the aforementioned advantages likewise obtain for the non-foamed aqueous polymer products of this invention, as will be apparent.)

The relative amounts of the various components of the foams of this invention can vary widely. Functionally expressed, the amount of surfactant foaming agent to be used will be that sufficient to cause the aqueous foamable solution of it and the gelling or viscosity-increasing agent, upon aeration, to form a foam having sufficient expansion value such that said foam has a density less than 1 g/cc, which expansion value generally will be greater than about 1.5, and preferably will be 2 to 20 (a range which can be characterized as "low expansion") and can be as high as 200 or even 1000. Such a foam will thus float on water and is less dense than most other liquids, e.g. flammable liquids, and thus is generally buoyant. Generally, the surfactant will be about 0.05 to 2 weight percent, preferably about 0.2 to 0.5 weight percent, of the foamable aqueous solution. The amount of gelling or viscosity-increasing prepolymer in the aqueous foamable solution will be that sufficient to gel or merely increase the viscosity of the fluid foam, whichever is desired, at a desired time upon or after application of the fluid foam to the hazardous material or substrate, which time can be from less than 10 seconds to 20 minutes or longer after the foamable solution is formed, depending, for example, on the functionality and the chemical structure of the polyamine-reactive prepolymer and the polyamine reactant, the desired extent or nature of the application, e.g. how large an area is to be covered with the fluid foam before it gels or reaches its desired increase in viscosity, whether the substrate is horizontal, vertical, or inclined, the particular hazard to be controlled, etc. Generally, the amount of the prepolymer (excluding its solvent) will be a small amount, about 2 to 15 weight percent, preferably about 3 to 10 weight percent, of the foamable aqueous solution; thus, the solids content of the foams of this invention which is attributable to the gelling or viscosity-increasing prepolymer will be low. When the prepolymer is used in the form of a concentrate solution in an organic solvent, e.g. acetone, such solutions will have a concentration generally about 20 to 90 weight percent of the prepolymer, depending upon the molecular weight and chemical nature of the prepolymer. Generally, the amount of such solvent in the foamable aqueous solution and foam thereof will be less than about 30 weight percent, preferably less than about 10 weight percent. The amount of polyamine reactant will generally be about a stoichiometric equivalent amount to react with the available isocyanate groups in the prepolymer. Greater amounts, e.g

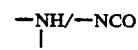

ratios up to 2/1 or even 4/1, or lesser amounts, e.g.

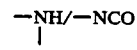

ratios of less than 1/2 or even 1/4 can be useful to obtain desired gel times and gel quality. If only viscosity increase is desired, functionality of prepolymer and/or polyamine must be considered as well as stoichiometry. The amount of water to be used will be that amount to provide sufficiently low viscosity to the foamable aqueous solution to enable its efficient handling and to enable the fluid foam to flow and cover the desired substrate area and form a foam of sufficient expansion and quality; in any case, however, the amount of water to be used will be such that it is the major component, by weight, i.e. greater than 50 weight percent and generally about 53 to 98 weight percent, preferably 75 to 97 weight percent, of the aqueous foamable solution (as well as of the fluid foam and gelled or viscous foam produced therefrom). The amount of air to be entrained in the aqueous foamable solution will be that sufficient to obtain sufficient expansion; in any case, however, the amount of air to be entrained generally will be such that the fluid air foam and the gelled or viscous air foam will have the aforementioned expansion value, and preferably the entrained air will be the major component of the foam thereof by volume, i.e. greater than 50 volume percent, and even as high as 98 volume percent, and more preferably in the range of 75 to 90 volume percent.

The aqueous prepolymer and polyamine reaction mixture, immediately upon preparation, can also be used, without aeration, to produce a non-cellular, aqueous gel of polyurea polymer, the major component of which is water by weight, for purposes of treating hazardous material, like that treated with the fluid air foams described herein, by spraying the aqueous prepolymer-polyamine solution on the surface of the hazardous material, using conventional spraying equipment with non-air asperating nozzles. Surfactants are not included as foaming agents in the reaction mixture but may be included as wetting agents to enhance wetting or penetration of the material treated. The relative amounts of the prepolymer, polyamine, and water can be like those described herein for the air foams of this invention. Many of the optional components of the foamed system of this invention can be included in the non-foamed systems of this invention, such as polymeric latex particles. Such aqueous solution can also be used to seal a structure, such as a water-bearing structure, e.g. a sewer, water line, or aqueduct, in the manipulative manner, for example, described in U.S. Pat. Nos. 3,894,131 (Speech) and 4,315,703 (Gasper), or used to consolidate aggregate material, such as soil, mineral aggregate, organic material, and synthetic aggregate, in the manipulative manner described in U.S. Pat. Nos. 3,805,531 (Kistner) and 3,805,532 (Kistner). Said descriptions of said patents are incorporated herein by reference for the above-described purposes.

Aliphatic isocyanate-terminated poly(oxyalkylene) prepolymers useful in preparing the hydrophilic polyurea polymers of this invention can be prepared by reacting aliphatic polyisocyanate with a poly(oxyalkylene) (or polyether) polyol having at least two hydroxyl groups and a chain containing a plurality of sufficient oxyethylene units to render the chain hydrophilic and impart water solubility to the prepolymer, the NCO/OH equivalent ratio in the mixture of the two reactants being at least 2:1 and preferably slightly higher, e.g., 2.1:1 to 2.5:1. As a result of the reaction, the polyol and aliphatic polyisocyanate residues are linked by carbamate or urethane linkages, —OC(O)NH—, to yield hydrophilic poly(oxyalkylene) poly(urethane) isocyanate-terminated prepolymers. "Aliphatic polyisocyanate" means herein a compound in which at least one of the —NCO groups is bonded to a carbon atom of an alkylene moiety, such as methylene (—CH$_2$—) or methylidyne

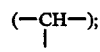

an example of such aliphatic polyisocyanate is OCN(CH$_2$)$_6$NCO. Thus, the aliphatic isocyanate-terminated prepolymer will have predominately amine-reactive

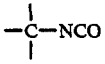

end groups, the depicted carbon atom to which the depicted —NCO group is attached being an aliphatic carbon atom.

The use of urethane-forming catalyst, such as dibutyl tin dilaurate and especially ferric acetonylacetonate, are preferred when preparing the prepolymer to avoid extended reaction times and elevated temperatures which may result in undesirable by-products (e.g. allophonate and isocyanate dimers and trimers), and undesirably effect functionality and viscosity. By using merely 10–100 ppm and preferably 10–50 ppm (i.e. parts of catalyst/million parts of total reactants) ferric acetonylacetonate, a reduction in reaction time from 48 hrs. to 6 hrs. and reaction temperature of 100° C. to 50° C. are realized. The fact that the reaction can be accelerated with ferric acetonylacetonate to such great extent is particularly surprising in light of the fact that heretofore when such catalyst was used in urethane-forming reactions the amount of catalyst thought necessary was at least ten-fold that found effective in promoting the urethane-forming reaction of this invention.

Because of the low reactivity of this prepolymer with water (compared to the analogous prepolymer prepared from aromatic isocyanates), little if any of the side reaction to yield carbon dioxide and urylene linkages takes place between the aliphatic isocyanate-terminated prepolymers and water when reactive polyamines are subsequently reacted with the prepolymer in the presence of water to make the polymers of this invention. The prepolymer-polyamine reaction can proceed practically instantaneously without requiring a catalyst to increase the reaction rate. When such reaction, or polymerization or crosslinking, occurs in the practice of this invention, where the major component, by weight, in the reaction system is water, the water-based polyurea product can be made in the form of (1) a gelled aqueous solution, (2) a gelled, closed-cell air foam, i.e., a hydrogel air foam, (3) a viscous aqueous solution, or, (4) a viscous, closed-cell air foam.

Water-soluble, low moisture sensitive, amine-reactive, hydrophilic, aliphatic isocyanate-terminated prepolymers useful in this invention can be expressed in terms of the formula:

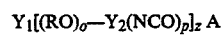

In formula A, Y$_1$ is an active hydrogen-free residue of a low molecular weight, initiator organic compound having a plurality of active hydrogen atoms (e.g. 2 or 3), such as a polyhydroxyalkane, polyaminoalkane, or polyether polyol, e.g., ethylene glycol, ethylene diamine, glycerol, or 1,1,1-trimethylolpropane, commonly used in making commercial polyether polyols. (RO)$_o$ is a hydrophilic-poly(oxyalkylene) chain having a plurality of oxyethylene units (and, optionally, higher oxyalkylene units, e.g., units with 3 or 4 carbon atoms) such as (1) a poly(oxyethylene) chain, (2) a chain having alternating blocks or backbone segments of oxyethylene units and oxypropylene units, or (3) a chain of randomly distributed (i.e., a heteric mixture) of oxyethylene and oxypropylene units. The subscript o is the number of oxyalkylene units in said poly(oxyalkylene) chain. The number of oxyethylene units in the prepolymer is sufficient to render it hydrophilic and water-soluble; generally, the oxyethylene content of the prepolymer for this purpose will be at least 30 weight percent, preferably greater than about 50 or even about 70 to 80 weight percent or higher, of the prepolymer. $Y_2$ is an organic linkage or bridge having an aliphatic portion(s), e.g. alkylene, to which the depicted isocyanate moieties are bonded, the function of $Y_2$ being to bond said poly(oxyalkylene) chain to the isocyanate moieties shown in the formula, the subscript p being 1 to 5, preferably 1, each of those isocyanate moieties being bonded to the same or different aliphatic carbon atoms of $Y_2$. Where the prepolymer is prepared by reacting a poly(oxyalkylene) polyol and an aliphatic polyisocyanate, the poly(oxyalkylene) chain of the prepolymer will be principally terminated with the group $-OC(O)NH-R-(NCO)_p$, R' being the organic residue of the polyisocyanate, with the proviso that the $-NCO$ moiety of said terminal group is attached to an alkylene portion of said R' residue. The moiety $-C(O)NH-$ together with the adjacent oxygen atom of the poly(oxyalkylene) chain is a carbamate (or urethane) group, $-OC(O)NH-$, resulting from the reaction of a hydroxy group of the poly(oxyalkylene) polyol reactant with an isocyanate moiety from the aliphatic polyisocyanate reactant. The subscript z is a number equal to the functionality or number of said active-hydrogen atoms in said initiator compound (e.g. said polyhydroxyalkane) and generally z will be 2 to 6, preferably 2 to 4.

The prepolymers used in this invention are generally normally liquids or greasy, waxy or pasty solids at room temperature.

The terminal isocyanate groups of the above-described prepolymer readily react with—and preferentially to the water present when the—polyurea products of this invention are made—the water-soluble, isocyanate-reactive polyamine chain extender or crosslinker, resulting in the formation of polyurea polymer having a plurality of said hydrophilic poly(oxyalkylene) chains.

The water-soluble, isocyanate-reactive polyamines used in this invention are preferably aliphatic polyamines containing at least two primary and/or secondary amine groups, $-NH_2$ and/or

attached to an alkylene carbon atom. Said polyamine can contain O, S or additional N atoms bonded only to carbon atoms, and can also contain other hetero atom containing groups such as carboxyamido, $-CONR-$, where R is H or $C_1$ to $C_4$ lower alkyl. Suitable polyamines include water-soluble or water-dispersible polyamines such as ethylenediamine, 1,2-propylenediamine, trimethylenediamine, tetramethylenediamine, hexamethylenediamine, piperazine, bis-aminoethyl ether, hydrazine, $H_2NCH(CH_3)CH_2[OCH_2CH(CH_3)]_{2.6}NH_2$ (JEFFAMINE D-230), diethylenetriamine, and triethylenetetramine and mixtures thereof. Optional reactants and modifiers, e.g. monofunctional amines, can be included in the prepolymer-polyamine-water reaction system.

The term "active hydrogen atom" as used herein refers to a hydrogen atom which reacts with isocyanate moiety under urethane or urea bond-forming conditions, (determined by the Zerewitinoff procedure, Journal of American Chemical Society, 49, p. 3181 (1927) such as that disclosed in U.S. Pat. No. 3,330,782).

Preferred water-soluble prepolymers within the scope of this invention are those of the formula:

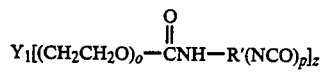

where $Y_1$, p and z are as defined above for Formula A, p preferably being 1 to 3, z preferably being 2 to 4, R' is the organic residue of an aliphatic polyisocyanate as defined above and has one or more aliphatic carbon atoms to which the depicted isocyanate groups are bonded, and o is the number of oxyethylene units necessary to make the prepolymer hydrophilic and soluble in water.

A species of prepolymer within the scope of Formula B can be represented by the formula $OCN(CH_2)_6NH-CO(OCH_2CH_2)_nOCONH(CH_2)_6NCO$ where n is sufficiently high to render the prepolymer hydrophilic and water-soluble.

Another preferred subclass of water-soluble prepolymers useful in this invention can be expressed by the formula:

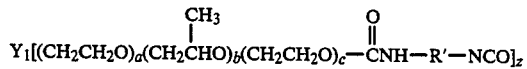

where $Y_1$, R', and z are as defined in Formula B, z preferably being 2 to 4, and a, b and c are integers such that the ratio of (a+c)/b is greater than 1, e.g. up to 4 or greater, and thus the prepolymers are water-soluble.

Another preferred subclass of water-soluble prepolymers useful in this invention can be expressed by the formula:

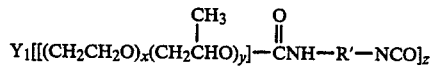

where $Y_1$, R', and z are as defined in Formula B, x and y are integers such that the ratio x/y is greater than 1, e.g. up to 3 or greater, and thus the prepolymers are water-soluble, the $CH_2CH_2O$ and $CH_2CH(CH_3)O$ units being randomly distributed within the brackets enclosing the same.

Particularly useful species of the prepolymers of this invention are those represented by the formula:

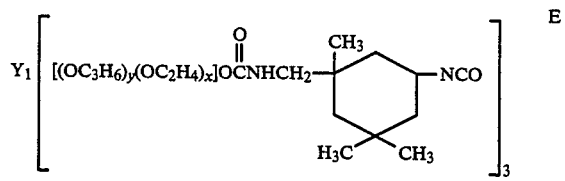

where $Y_1$ is an active hydrogen-free residue of a low molecular weight trimethylolpropane, such as trimethylpropane or glycerol, and the ratio x/y is as defined in Formula D, preferably 3/1 to 6/1.

The hydrophilic polyurea polymers of this invention will contain one or more polyurylene-containing segments formed from the reaction of the aliphatic isocyanate-terminated prepolymer with a polyamine, e.g. segments of the formula

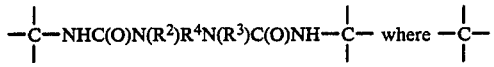

is part of the R' group defined above, $R^2$ and $R^3$ are H to $C_1$ to $C_4$ lower alkyl or $R^2$ and $R^3$ taken together can form a ring, and $R^4$ is an alkylene or aralkylene radical which can contain non-adjacent oxygen atoms or non-adjacent

groups where $R^5$ is H or $C_1$ to $C_4$ lower alkyl or

An example of a segment in a chain-extended polyurea polymer of this invention is that represented by the formula

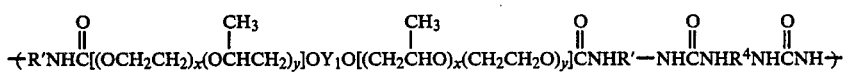

where R', $Y_1$, $R^4$ and x and y are as defined above, and the $CH_2CH_2O$ and $CH_2CH(CH_3)O$ units are randomly distributed within the brackets enclosing the same.

If the isocyanate functionality of the prepolymer is about 2, and a diamine, e.g., hexamethylene diamine, is used as the polyamine reactant, the polyamine functions as a chain-extender and the resulting polyurea formed will be mainly linear and non-crosslinked, unless there is included in the reaction mixture polyamine crosslinker with functionality greater than 2 such as diethylenetriamine, triethylenetetramine, etc. If the isocyanate functionality of the prepolymer is greater than 2, e.g. 3, a crosslinked polyurea will generally result with any polyamine.

To insure sufficient hydrophilicity of the polyurea of this invention, the polyether polyol used to prepare the prepolymer will generally have a number average molecular weight range of about 1,000 to 20,000, preferably 3,000 to 10,000. Commercially available polyol precursors useful for that purpose are those sold, for example, under the trademark THANOL, e.g. THANOL 4070, those sold under the trademark CARBOWAX, e.g. CARBOWAX 3350 (formerly called 4000), having about 76 oxyethylene units in a chain like that shown in Formula B, and those sold under the trademark PLURONIC, e.g. PLURONIC F-77, having the poly(oxyalkylene) chain shown in Formula C where a+c is about 108 and b is about 35.

Aliphatic polyisocyanates which can be used to prepare the isocyanate-terminated prepolymer used in this invention and described above include conventional aliphatic polyisocyanates. One of the most useful polyisocyanate compounds which can be used for this purpose is 3-isocyanatomethyl-3,5,5-trimethylcyclohexylisocyanate (isophorone diisocyanate). Other polyisocyanate compounds which can be used are hexamethylene-1,6-diisocyanate, methylenebis-(4-cyclohexylisocyanate), p-xylylenediisocyanate, 1,3-bis[(dimethylisocyanato)methyl]benzene, 1,6-diisocyanato-2,2,4,4-tetramethylhexane, 1,6-diisocyanato-2,4,4-trimethylhexane, methylcyclohexyldiisocyanate, 1-isocyanatomethylphenyl-4-isocyanate, $OCN(CH_2)_6N$-$[CONH(CH_2)_6NCO]_2$ (Desmondur N-100), and mixtures thereof. A list of useful commercially available aliphatic polyisocyanates is found in Encyclopedia of Chemical Technology by Kirk and Othmer, 2nd Ed., Vol. 12, pages 46, 47, Interscience Pub. (1967).

The organic residues, R' supra, provided by the polyisocyanate, can be alkylene groups, such as ethylene, isobutylene, hexylene, and methylenedicyclohexylene, having 2 to about 20 carbon atoms, aralkylene groups, such as $-CH_2C_6H_4-$ and $-CH_2C_6H_4CH_2-$ having up to 20 carbon atoms, aliphatic polyethers, such as $-(C_2H_4O)_yC_2H_4-$, where y is 1 to about 5, and combinations thereof. Such groups can also include other hetero moieties (besides $-O-$), including $-S-$ and

However, R' is preferably free of groups with active hydrogen atoms.

In preparing the various polyurea products of this invention, the prepolymer may be dissolved in a suitable water-soluble or water-dispersible, non-reactive (free of active hydrogen atoms) organic solvent to facilitate handling, the resulting solution having a lower viscosity which makes it more readily pumpable. The solvent chosen preferably should be such that the resulting solution will be liquid at the ambient conditions of storage or use. Useful solvents include acetone, ethyl acetate, methyl ethyl ketone, dibutyl phthalate, benzyl butyl phthalate, tetrahydrofuran, dimethylformamide, diethylene glycol monoethyl ether acetate (sold under the trade designation CARBITOL acetate), propylene glycol monomethyl ether acetate (sold under the trade designation ARCOSOLV PM acetate), gamma-butyrolactone, N-methyl-2-pyrrolidone, and diethyl acetal. If the amount of solvent used to facilitate handling would disadvantageously affect the foamability of prepolymer-surfactant aqueous fluid, a readily foamable, readily pumpable fluid can be made with a lesser amount of such solvent by additionally incorporating in the prepolymer-solvent solution a lower molecular weight prepolymer or other reactive diluent, which may even be water-insoluble per se (but soluble in the prepolymer-solvent solution). Examples of such reactive diluents include aliphatic diisocyanate-terminated poly(oxyethylene) prepolymer and the reaction product of an aliphatic diisocyanate and neopentyl glycol.

The surfactants, or surface active agents, useful as foaming agents in the practice of this invention to make the foamed polyurea products are synthetic or natural organic compounds or materials capable of foaming water, which are compatible with the polyamine-reactive poly(oxyalkylene) isocyanate-terminated prepolymer. Those surfactants which are preferred are those sometimes characterized as capable of forming "strongly foaming solutions", e.g., see "Foams", J.J.

Bikerman, published by Springer-Verlag, New York, Inc., pages 108–132 (1973). The usefulness of a surfactant, and its amount, for purposes of this invention, can be determined by the foam volume or height and its resistance to collapse. Generally, the applicable surfactant and amount thereof useful in producing the foams of this invention will yield a foam volume (or height) at least one-and-a-half, and preferable at least twice, that of the foamable aqueous solution, a simple test for this purpose being the shaking by hand of the solution in a suitable closed container. For example, 100 g of such solution is vigorously shaken 25 times in a 480 cc, or larger, closed glass jar or a calibrated vessel, and the height of the resulting foam vis-a-vis the height of the solution before shaking is measured, the ratio of foam height to solution height being the expansion value.

The surfactants useful in this invention to make the foamed polyurea products can be nonionic, cationic, anionic, or amphoteric, and compatible mixtures thereof. Classes of surfactants which are useful include: soaps or the salts of fatty acids, such as those having the general formula RCOOM, where R is a fatty aliphatic group and M is an alkali metal, e.g., sodium oleate, laurate, palmitate, or stearate; fatty alkyl sulfates, such as those of the general formula $ROSO_2OM$, e.g., sodium octyl, decyl, dodecyl, tetradecyl, hexadecyl, heptadecyl, or octadecyl sulfate; salts of alkarylsulfonic acids, such as those of the general formula $RC_6H_4SO_3M$, e.g., sodium octylbenzene sulfonate; ethylene oxide adducts, such as those of the general formula $R(CH_2CH_2O)_nH$ where R is a fatty aliphatic radical, e.g., where R is $C_{10}H_{21}O$ to $C_{16}H_{33}O$ and n is 10 to 60; those of the general formula $R(OCH_2CH_2)_nOSO_3M$, where R is a $C_{10}$ to $C_{18}$ alkyl, n is 1 to 3, and M is sodium; and salts of dialkyl sulfosuccinic acids, e.g., sodium dioctyl sulfosuccinate. Also see Encyclopedia of Chemical Technology, Kirk-Othmer, 3rd Ed., Vol. 22, pages 347–387, John Wiley & Sons (1983) for other surfactants useful in this invention. Many of these hydrocarbon surfactants are biodegradable, making the foams made therefrom particularly advantageous where their biodegradability is desired, e.g. in treating municipal waste sites and sanitary landfills.

Another class of surfactants useful as foaming agents in this invention are fluoroaliphatic surfactants which can be used alone or particularly in combination with fluorine-free surfactants (sometimes called "hydrocarbon surfactants") where the foam is to be used to control the vapor emission of flammable liquid by formation of an aqueous surfactant film on the surface thereof, such film forming before the fluid foam has completely gelled or reached high viscosity. In such combinations of surfactants, the ratio of fluorine-free surfactant to fluoroaliphatic surfactant generally will be 1:25 to 10:1, usually 1:15 to 5:1.

Fluoroaliphatic surfactants which can be used are those which contain one or more fluorinated aliphatic radicals ($R_f$) and one or more water-solubilizing polar groups (Z), which radicals and groups are usually connected together by suitable linking groups (Q).

Fluoroaliphatic surfactants useful and incorporated herein by reference are those disclosed in U.S. Pat. Nos. 3,562,156 (Francen), 3,772,195 (Francen), and 4,359,096 (Berger), and European Patent Application 0 073 863 A1. The particular structure of the fluoroaliphatic surfactant is not critical; rather, it is the balance of the physical properties of the compound that determines its usefulness for the purpose of this invention. It may be desirable where the fluoroaliphatic and hydrocarbon surfactants are combined for the said control of vapor emission of flammable liquid that the combination of fluoroaliphatic radical and water-solubilizing group in the fluoroaliphatic surfactant be so balanced as to provide the fluoroaliphatic surfactant with a solubility in water at 25° C. of at least 0.01 percent by weight. It is preferred that the solubility in water be at least about 0.25 percent by weight. The fluoroaliphatic surfactant to be used in said combination with hydrocarbon surfactant generally will be sufficiently surface active to provide a surface tension of less than about 28 dynes/cm, preferably less than 23 dynes/cm, in aqueous solution at a concentration of about 0.25% or less.

The fluoroaliphatic surfactant will contain at least about 20 percent by weight of fluorine, i.e., carbon-bonded fluorine, in the surfactant. The fluorinated aliphatic radical, $R_f$, in the fluoroaliphatic surfactant used in this invention can be generally described as a fluorinated, saturated, monovalent, non-aromatic radical of at least 3 carbon atoms. The aliphatic chain may be straight, branched, or, if sufficiently large, cyclic and may include oxygen or trivalent nitrogen atoms bonded only to carbon atoms. A fully fluorinated radical is preferred, but hydrogen or chlorine atoms may be present as substituents provided that not more than one atom of either is present for every two carbon atoms, and preferably, the radical contains at least a terminal perfluoromethyl group. While radicals containing a larger number of carbon atoms will function adequately, compounds containing not more than about 20 carbon atoms are preferred since larger radicals usually represent a less efficient utilization of fluorine than is possible with shorter chains. Fluoroaliphatic radicals containing about 5 to 12 carbon atoms are most preferred.

The water-solubilizing polar group, Z, of the fluoroaliphatic surfactant can be an anionic, cationic, non-ionic or amphoteric moiety or combinations thereof. Typical anionic groups include $CO_2H$, $CO_2M$, $SO_3H$, $SO_3M$, $OSO_3H$, $OSO_3M$, $OPO(OH)_2$, and $OPO(OM)_2$, where M is a metallic ion, such as sodium, potassium, calcium, etc. Typical cationic groups include $NH_2$, NHR, where R is a lower alkyl group such as methyl, ethyl or butyl, $NR'_3A'$, where R' is a lower alkyl group or hydrogen and A' is an anion such as chloride, sulphate, phosphate, hydroxyl, etc. Typical non-ionic groups would include $NR_2 \rightarrow O$ and those derived from polyethylene oxide and mixed polyethylene oxide-polypropylene oxide polyols. Typical mixed or amphoteric groups would include $N^+(CH_3)_2C_2H_4COO^-$.

The linking group, Q, is a multivalent, generally divalent, linking group such as alkylene, arylene, sulfonamidoalkylene, carbonamidoalkylene, and the like. In some instances more than one fluoroaliphatic radical may be attached to a single linking group and in other instances a single fluoroaliphatic radical may be linked by a single linking group to more than one polar solubilizing group.

A particularly useful class of fluoroaliphatic surfactants which can be used in this invention are those of the formula $(R_f)_n(Q)_mZ$, where $R_f$ is said fluoroaliphatic radical, n is 1 or 2, Q is said linking group, m is an integer of 0 to 2, and Z is said water-solubilizing group.

Representative fluoroaliphatic surfactants useful in this invention include:

$C_8F_{17}SO_3K$ $C_6F_{13}SO_2N(CH_2CHOHCH_2SO_3^-)C_3H_6N^+(CH_3)_2C_2H_4OH$ $C_8F_{17}SO_2NHCH_2C_6H_4SO_3Na$ $C_8F_{17}SO_2NHC_6H_4SO_3Na$ $C_6F_{13}SO_2N(C_3H_6SO_3^-)C_3H_6N^+(CH_3)_2C_2H_4OH$ $C_7F_{15}CONHC_3H_6N^+(CH_3)_2C_2H_4COO^-$ $C_8F_{17}C_2H_4SC_2H_4CONHC(CH_3)_2CH_2SO_3Na$ $C_8F_{17}SO_2N(C_2H_5)C_2H_4OP(O)(OH)_2$ $C_6F_{13}SO_2NHC_3H_6N^+(CH_3)_3Cl^-$ $C_8F_{17}SO_2NHC_3H_6N^{+(CH_3)_3}-O_3SOCH_3$ $(CF_3)_2CF(CF_2)_6COOH \cdot H_2NC_2H_5$ $C_7F_{15}COOH \cdot H_2NC_3H_6N^+(CH_{32}C_2H_4COO^-$ $C_7F_{15}CONHC_3H_6N(CH_3)_2 \rightarrow O$ $C_8F_{17}SO_2N(C_2H_5)CH_2CO_2K$ $C_6F_{13}C_2H_4SO_2N(CH_3)C_2H_4N^+(CH_3)_2C_2H_4COO^-$ $C_6F_{13}SO_2N(CH_2CHOHCH_2SO_3Na)C_3H_6N(CH_3)_2$ $C_8F_{17}C_2H_4SCH(CH_2COONa)CONNa$ $C_8F_{17}C_2H_4SC_2H_4CONHC_2H_4N^+(CH_3)_3Cl^-$ $C_{10}F_{20}HOC_6H_4SO_3Na$ $(CF_3)_2CF(CF_2)_4CONHC_2H_4SO_3Na$ $[C_6F_{13}SO_2NHC_3H_6N^+(CH_3)_2C_2H_4OH]OH^-$ $[C_6F_{13}SO_2N(CH_2CH_2OH)C_3H_6N^+(CH_3)_2C_2H_4OH]OH^-$ $C_6F_{13}SO_2N(CH_2CH_2OH)C_3H_6N(CH_3)_2$ $C_6F_{13}SO_2NHC_3H_6N^+(CH_3)_2CH_2CH_2COO^-$ $C_6F_{13}SO_2N(CH_2COOH)C_3H_6N(CH_3)_2$ $C_7F_{15}COOH \cdot H_2NCH_2COOH$ $C_8F_{17}C_2H_4SC_2H_4CONH_2$ $C_6F_{13}SO_2NHC_3H_6N(CH_3)_2 \rightarrow O$ $C_8F_{17}SO_2NHC_3H_6N(CH_3)C_3H_6SO_3Na$ $C_8F_{17}SO_2NHC_3H_6N(C_2H_4OH)C_3H_6SO_3Na$ $C_7F_{15}CONHC_3H_6N(CH_3)C_3H_6SO_3Na$ $C_6F_{13}SO_2N(C_2H_5)C_3H_6NHCH_2CH(OH)CH_2SO_3Na$ and compatible mixtures thereof.

The water-soluble, fluorine-free surfactants used in combination with the fluoroaliphatic surfactants to make a foam having film-forming capability like AFFF fire-fighting agents are those organic compounds which are water-soluble, e.g., to at least about 0.02 percent by weight in water at 25° C., and are capable of promoting the film-forming ability of a normally non-film-forming, aqueous fluorocarbon surfactant solution. Such surfactants substantially completely emulsify at least one phase of a mixture of equal volumes of cyclohexane and water at a concentration of about 0.1 to 10 weight percent of the water. Additionally, the fluorine-free surfactants used in the combination must be compatible with the fluoroaliphatic surfactants. Compatibility here means that the two types of surfactants do not interact to produce an inactive product. The fluorine-free surfactants particularly useful alone or in said combination with the fluoroaliphatic surfactants include those described in the aforementioned patents and they can be selected on the basis of the tests described in U.S. Pat. No. 3,772,195 (Francen).

Representative fluorine-free surfactants useful in the practice of this invention alone or in combination with the fluoroaliphatic surfactants include:

$C_8H_{17}OSO_3Na$ $C_{10}H_{21}OSO_3Na$ $C_{12}H_{25}OSO_3Na$ $C_{10}H_{21}SO_3K$

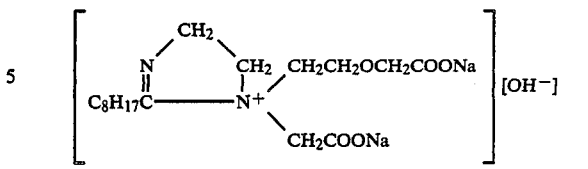

$C_{12}H_{25}N(CH_2CH_2COONa)_2$ $C_8H_{17}C_6H_4O(C_2H_4O)_{30}H$ $C_{12}H_{25}N^+(CH_3)_2C_2H_4SO_3^-$ $C_8H_{17}O_2CCH_2CH(CO_2C_8H_{17})SO_3Na$ $C_{12}H_{25}N^+(CH_3)_3Cl^-$ $(C_8H_{17}O)_2P(O)ONa$ $HO(C_2H_4O)_a(C_3H_6O)_b(C_2H_4O)_cH$, MW 6500, where $a+b$ is about 108 and c is about 35

$C_{12}H_{25}O(C_2H_4O)_4C_2H_4OSO_3^-NH_4^+$ $C_8H_{17}SC_2H_4CONHC(CH_3)_3CH_2SO_3Na$ $C_{12}H_{25}SO_2N(CH_2COO^-)C_3H_6N^+(CH_3)_3$ $C_{12}H_{25}N(CH_3)_2 \rightarrow O$ and compatible mixtures thereof. Certain fluorine-free silicone surfactants are known to be useful in forming AFFF solutions or as foaming agents per se and they can be used.

One particularly useful foam system of this invention is that obtained by mixing the aliphatic isocyanate-terminated poly(oxyalkylene) prepolymer with the foaming agents sold as concentrates under the trademark LIGHT WATER such as the AFFF type or AFFF/ATC type, which products are described in said 3M bulletins and said U.S. Pat. Nos. 3,562,156 and 3,772,195. Those foam systems can be applied with the same equipment used in applying those commercial products and for the same purpose.

In general, the weight ratio of fluorine-free surfactant to fluoroaliphatic surfactant in the combinations of the AFFF type is in the range of 1:25 to 10:1.

Optional components of the systems of this invention include: polymeric stabilizers and thickeners such as polysaccharides, partially hydrolyzed protein, starches, polyvinyl resins, e.g. polyvinyl alcohol and polyacrylamides, carboxyvinyl polymers, and poly(oxyethylene) glycol; foam stabilizers such as ethylene glycol, diethylene glycol, glycerol, ethyl CELLOSOLVE, and butyl CARBITOL; foam tougheners and shrink control agents, such as aqueous rubber or polymeric latices, e.g. styrene-butadiene rubber latices, poly(chloroprene)rubber latices, poly(chloroprene-co-methacrylic acid) rubber latices, and the polymer latices described in said U.S. Pat. No. 4,315,703; dyes, and pigments, such as titanium dioxide; and other additives or components such as electrolytes, corrosion inhibitors, and biocides. Such optional components should be compatible with the other components in the systems and are used in amounts which do not disadvantageously affect the desired properties, such as foamability, and function, such as the sealing capability, of the foam system. The total amount of solids attributable to said optional components in the case of the foam systems will be such that the aqueous solution is still foamable and the density of the foam prepared therefrom is less than 1 g/cc. Generally, the amount of solids attributable to said optional components will be less than about 40 weight percent, preferably less than about 30 weight percent, of the aqueous solution.

The aqueous fluid foams of this invention can be generated by the following procedure. Solutions of the hydrophilic aliphatic isocyanato-terminated poly(oxyalkylene) prepolymers in water-soluble organic solvents, e.g., acetone or methyl ethyl ketone, or in water-soluble or dispersible organic solvents, e.g., dibutyl phthalate, or as solutions in a blend of solvents, are mixed with an aqueous solution containing surfactant and polyamine in the desired ratio, e.g., with a proportioning apparatus. The resulting aqueous, foamable solution is sprayed under pressure through a foam-generating nozzle, preferably an air-aspirating nozzle, to generate the fluid aqueous foam. Gelation time of the aqueous foam, or the time at which it reaches its desired increase in viscosity, can be controlled by the proper selection and concentration of the reactive prepolymer, polyamine and optional chain terminating agents such as monofunctional amines.

A particularly useful proportioning, foam-generating and foam application apparatus for making the foamed polyurea products comprises a pressure vessel containing separate tanks for the reactive prepolymer, for a solvent for flushing out lines after use, and optionally, for water used to dilute the prepolymer, a pressure vessel for the aqueous solution of surfactant and polyamine reactant, a gear pump driven by a variable speed motor to supply via a check valve the reactive polymer agent and flush solvent from their tanks to a helical static mixer, a photo-electric tachometer to sense the speed of the gear pump and regulate the flow of such materials, lines fitted with air pressure regulators and valves for supplying compressed air to the pressure vessels to force the contents therefrom via dip tubes and lines to the check valve, flexible hose connecting the check valve, static mixer, and an air-aspirating nozzle (such as that described in said 3M bulletin Y-FATCB(311)BE) for application of the foam, and other associated pipe lines or hoses, etc., connecting the pieces of equipment as described.

Descriptions of various foam system equipment that can be used for handling and applying the foam system of this invention are described in above-cited 3M bulletins and in the NFPA-11-1983 Standard of the National Fire Protection Association, Inc. for "Low Expansion Foam and Combined Agent Systems".

The hazardous materials which can be treated or controlled with the foam in accordance with this invention include the various materials present in hazardous waste sites described at the beginning of this specification, such as land burial dumps, impoundments, and lagoons. Such materials can be organic or inorganic liquids, semi-liquids, or solids, such as synthetic or natural organic chemicals, heavy or toxic metals, solvents, effluents, household garbage and trash, discarded products, spent raw materials, contaminated containers, sludges, mill tailings, burn residues, contaminated soil, flammable and volatile liquids, etc., disposed in such sites from industrial and commercial operations, etc. Such wastes can be toxic, noxious, ignitable, flammable, combustible, corrosive, or dangerously reactive. The body of such materials can be treated in situ with the foam or as excavated or removed from such sites. Spills or leaks of hazardous liquids from pipelines or containers such as tanks or vehicles can also be treated.

The foams of this invention are particularly useful during or in connection with the excavation of material from hazardous waste sites (e.g. "Superfund sites"), a type of clean-up operation which many believe is the best solution to the problems posed by such sites.

Materials which are not wastes, spills, or the like but rather have utility and are innately harmful or have toxicity, and thus are potentially hazardous, can also be treated with the foam, for example coal in transport by train cars or barges or the coal in mine tunnels, to seal the exposed surfaces from air and minimize or prevent fires or to control such fires. Thus, the term "hazardous" in its broader sense is used in this application to include present or imminent hazards due to existing exposure as well as potential hazards due to the innate harmful or toxic effects of a material which becomes hazardous upon exposure.

The foams can also be used in suppression of noise or shock waves emanating, for example, from machinery. Plastic bags, e.g., polyethylene bags, filled with the foam can also be used for shock absorption, e.g. as rescue pads in the escape from burning buildings.

Other applications for foam of this invention include use as a thermal insulating blanket or barrier, e.g., for Class A combustible material such as residential or commercial building structures, e.g., walls and roofs, and use as a fire break in brush or forest fires.

Another use as an insulating blanket for the foam of this invention is as an aid in controlling the curing or setting of cementitious materials, such as concrete, mortar, or cement slurries, especially in cold, subfreezing weather, where the foam acts as a thermal blanket for accelerating the curing of the slurry by retaining the heat of the curing reaction, or where it is desired to retain moisture during curing or preventing rain water from affecting curing.

Generally, the materials or substrates that can be treated with the foams of this invention will be those that are not reactive, undesirably reactive, or adversely affected by the foams.

The amount or thickness of foam applied to the hazardous material or substrate or the extent of its application can vary depending on such factors as the nature, magnitude, location, and permanency of the hazardous material or substrates, the presence of environmental factors such as wind, rain, drainage, etc., and the particular threat to health, safety, and environment that the material poses. The thickness of the foam applied to the material thus can vary, for example from 1 cm to 30 cm or higher, e.g. up to 1 meter or more. In any event, the thickness of the foam will generally be sufficient to alleviate or prevent the threat posed by the material or to achieve the desired function of the foam, e.g as an insulating blanket, shock wave absorber, and noise suppresser. Where the material evolves or releases volatile or superficial products such as gases, fumes, vapors, dust, etc., or it is desired to seal a material from ambient air to control or prevent combustion or oxidation of the material, the amount or thickness of the foam will be such as to suppress the volatilization or escape of the material to the atmosphere or suppress its contact with atmosphere, the relative vapor impermeability of the foam due to its large amount of water and closed cell structure significantly contributing to such suppression.

In the case of flammable liquids such as hydrocarbons and polar solvents and combustible liquids, such as gasoline, diesel fuel and other fuels, or chemicals which are volatile or noxious, such as naphthalene, the foam of this invention can be applied in the same manner as the conventional aqueous film-forming solutions applied as a water-base foam for fire suppression or vapor control—see the aforementioned commercial bulletins and NFPA $tandard 11-1983. Like such conventional products, where the surfactant used in generating the foams of this invention is the aforementioned combination of fluoroaliphatic and hydrocarbon surfactants, such foams can be used to control or combat fires of flammable materials, such as aircraft fuel fires, petrochemical storage facility fires, oil tanker fires, and coal car fires, and various industrial fires of spilled fuel and solvent. Like conventional AFFF products, the applied foam of this invention will spread over and float on the surface of the flammable or burning liquid. A durable, rapidly forming, and spreading vapor-sealing film of aqueous surfactant drains from the foam before it gels or becomes viscous, aiding it in suppressing the volatilization of the liquid and extinguishing such fires, such film and foam also securing non-ignited areas and preventing ignition or re-ignition. Because of the stability and long life of the gelled or viscous foam of this invention, the re-application of it will generally not be necessary or often required (particularly if the foam is gelled), unlike conventional AFFF products which produce foams having a much shorter life, due to drainage and collapse, and have greater mobility or susceptibility to dislodgment due to wind, evaporation, and the thermal convection caused by fires.

Objects and advantages of this invention are illustrated in the following examples. In these examples the "Ignition Test" was a test for flammable vapors carried out by passing by hand a burning wooden splint immediately above a test beaker containing the volatile flammable liquid and noting whether any vapor ignited, no ignition indicating that the vapors of the flammable liquid were suppressed. If no ignition occurred the burning splint was usually placed on the surface of the gelled foam and any ignition noted. The water referred to in these examples was tap water unless otherwise noted. Where comparison examples were carried out, they are sometimes designated by the letter "C" and followed by a number, e.g., C10, C20 etc.

EXAMPLES 1-6

These examples illustrate the preparation of gelled hydrophilic polyurea foams of this invention by the reaction, in aqueous solution, of polyamine with poly-(oxyethylene-co-oxypropylene)-poly(aliphatic isocyanate) prepolymer, and the utility of the foams in suppressing the vapors of flammable liquids.

The prepolymer used was prepared as follows. In a dry, 2-liter, 3-neck flask, fitted with a mechanical stirrer, condenser, thermometer, nitrogen inlet, and electric heating mantle, was placed 1488 g (0.3 mole) of an approximately 5000 mol. wt. polyether triol (a copolymer of 80:20 weight ratio of ethylene oxide:propylene oxide, having a random or atactic distribution, and sold under the trade designation THANOL 4070). To this stirred liquid was added 200 g (0.9 mole) of isophorone diisocyanate. The temperature of the reaction mixture was maintained at about 20° C. while stirring rapidly for 20 minutes, then 0.02 g of ferric acetonylacetonate catalyst was added and the temperature slowly raised to 50° C. over a 15-minute period. The reaction mixture was stirred and heated at 50°-55° C. for 6 hours, at which time infrared spectroscopic analysis of a sample of the reaction mixture indicated complete reaction to yield the desired, low moisture sensitive, isocyanate-terminated prepolymer product falling within the scope of Formula E, supra, where z is about 3, and hereinafter designated "Prepolymer A". A portion of Prepolymer A was diluted with diethylene glycol monoethyl ether acetate (CARBITOL acetate) to provide a 50 weight % solids solution, hereinafter designated "Prepolymer Solution A".

Aqueous air foams were prepared from the following ingredients (by shaking vigorously for one minute in a 240 cc glass jar to entrain air): surfactant or foaming solution, Prepolymer Solution A as a gelling agent, diethylenetriamine, and sufficient water to make 50 g of solution. The expansion value of the fluid aqueous air foams produced was about 3 to 5. Twenty grams of each fluid foam was poured immediately after forming into each of three 250 cc beakers containing 200 mL of cyclohexane, acetone and diisopropyl ether test liquid, respectively. The fluid foams floated on these organic solvents and gelled within about 60 seconds. Each beaker (and contents) was weighed immediately and again after one hour, and the loss in weight noted. Weighing was also done after 4 hours in one case. Ignition tests using a burning splint (as described above) were run after one hour.

Results of these examples are given in TABLE 1. These results show that each gelled foam formed an effective vapor suppressing blanket, as indicated by the low weight loss values and results of no ignition.

TABLE 1

| | EXAMPLES | | | | | |
|---|---|---|---|---|---|---|
| | 1 | 2 | 3 | 4 | 5 | 6 |
| Composition, g: | | | | | | |
| Prepolymer Solution A | 4 | 4 | 4 | 4 | 4 | 4 |
| Surfactant solution: | | | | | | |
| HC[a] | | | | | | |
| FC-600[b] | 3 | 3 | 3 | | | |
| Diethylenetriamine | 0.03 | 0.03 | 0.03 | 0.03 | 0.03 | 0.03 |
| Water | 43 | 43 | 43 | 45.5 | 45.5 | 45.5 |
| Organic test liquid: | | | | | | |
| cyclohexane | X | | | X | | |
| acetone | | X | | | X | |
| diisopropyl ether | | | X | | | X |
| Weight loss, g | | | | | | |
| 1 hour | 0.6 | 1.4 | 0.6 | 0.6 | 2.2 | 0.7 |
| 4 hours | 1.5 | | | | | |
| Ignition test results[d] | | | | | | |
| 1 hour | N | N | N | N | N[f] | N |
| 4 hours | N | | | | | |

[a] A solution of 21.2 wt. % sodium decyl sulfate, 5.3% N,N—dimethyl dodecylamine oxide 26.5% diethylene glycol monobutyl ether, 47% water.
[b] LIGHT WATER™ AFFF/ATC, 6% concentrate.
[c] Weight loss (g) with no foam was 1.9 (cyclohexane), 3.9 (acetone), and 4.2 (diisopropyl ether).
[d] N = No, no ignition, Y = Yes, vapors ignited. When no foam (of any type) was present on the liquids, all ignited in this test.
[f] Momentary flame.

EXAMPLE 7

This example illustrates the effective suppression of solvent vapor evolving from solvent-contaminated sand when covered with aqueous air foam of this invention.

The prepolymer used was prepared as follows. In a dry, 2-liter, 3-neck flask, fitted with a mechanical stirrer, condenser, thermometer, nitrogen inlet, and electric heating mantle, was placed 1488 g (0.3 mole) of an approximately 5000 mol. wt. polyether triol (a copolymer of 80:20 weight ratio of ethylene oxide:propylene oxide, having a random or atactic distribution, and sold under the trade designation THANOL 4070). To this stirred liquid was added 206.5 g (0.93 mole) of isophorone diisocyanate and 1.5 g (0.014 mole) neopentyl glycol. The temperature of the reaction mixture was slowly raised to 75° C. over a period of 20 minutes while stirring, then 0.02 g of ferric acetonylacetonate catalyst was added. The reaction mixture was stirred and heated at 75°–80° C. for 5 hours. At this time, infrared spectroscopic analysis of a sample of the reaction mixture indicated complete reaction to yield the desired, low moisture sensitive, isocyanate-terminated prepolymer product comprising prepolymer falling within the scope of Formula E, where z is about 3, and a diurethane diisocyanate reactive diluent derived from the neopentyl glycol and isophorone diisocyanate. The prepolymer product is hereafter designated "Prepolymer B". A portion of Prepolymer B was diluted with diethylene glycol monoethyl ether acetate (CARBITOL acetate) to provide a 70 weight % solids solution, hereinafter designated "Prepolymer Solution B".

Sand was placed to a depth of about 7 cm in the lower half of a two-piece, 25 cm diameter, cylindrical, glass chamber, having a total interior volume of about 5100 cc. Fifty mL each of benzene, heptane, and methyl ethyl ketone were mixed with the sand in the chamber. A glass plate was placed over the lower half of the chamber and the apparatus and solvent-contaminated sand allowed to stand overnight. The glass plate was then removed and the upper half of the glass chamber, containing gas inlet and outlet openings, was placed on top of the lower half of the chamber. An approximately 2.5 cm layer of fluid aqueous foam (prepared as described below) was placed on top of the solvent-containing sand in the chamber and the latter purged with nitrogen, as described below. A gas-tight seal between the upper and lower halves of the chamber was achieved by lubrication of the ground glass, cylinder mating edges of the two chamber halves with a silicone grease before assembly.

A nitrogen gas purge of about 340 cc per minute was established and maintained in the chamber before and after adding the fluid foam. Gas phase samples from this nitrogen sweep were analyzed by gas chromatography (GC). The fluid foam was generated from an aqueous surfactant-prepolymer-polyamine solution using an electric blender operated for 15 seconds. Immediately after foam generation, the fluid aqueous foam was added to the chamber, covering the solvent-laden sand, the foam gelling in about a minute. The top of the glass chamber was again put in place, sealed, and the exiting nitrogen purge gas was analyzed by gas chromatography for the presence of solvent vapors.

The above procedure was repeated in a comparative run where no fluid foam was placed on the solvent-laden sand.

The percent suppression by the foam of each solvent present in the solvent mixture was calculated at various time intervals by comparing solvent GC peak area ("counts") with foam present to solvent GC peak areas with the comparative run with no foam coverage. The results are shown in the TABLE 2. Essentially complete suppression of heptane was maintained throughout the six hours of testing. Benzene suppression was nearly constant at 63% suppression. Suppression of methyl ethyl ketone was 89% at one hour, but effectiveness decreased to about 58% after 6 hours.

The aqueous foam composition used was prepared as follows: 6% of Prepolymer Solution B, 0.15% of a solution of a blend of diethylenetriamine, triethylenediamine, and water in the ratio of 1:1:2 by weight; 1% surfactant solution consisting of 21.2% sodium decyl sulfate, 5.3% N,N-dimethyl dodecyl amine oxide, 26.5% diethylene glycol monobutyl ether, and 47% water; the balance of the composition being water.

TABLE 2

| Elapsed time* | Percent vapor suppression | | |
|---|---|---|---|
| | heptane | benzene | methyl ethyl ketone |
| Run with foam | | | |
| 1 hr. | 99.5 | 65 | 89 |
| 2 | 99.6 | 63 | 76 |
| 4 | 99.5 | 63.6 | 63 |
| 6 | 99.4 | 64 | 58 |
| Comparative run 1–6 hrs. | 0 | 0 | 0 |

*Measurement of time commenced with placement of foam on the sand.

EXAMPLE 8

This example illustrates the effective use of the aqueous air foams of this invention to suppress the vapors of hydrocarbon fuel present in the soil of a hazardous waste site.

A freshly exposed test area of about 1.2 meters in diameter was formed in the hydrocarbon fuel-contaminated soil of an actual hazardous waste site. Base-line emissions of vapor were measured a few cm above the surface of the test area. An aqueous air foam, having the same composition as that in Example 7 using Prepolymer Solution B, was sprayed onto the surface of the test area to a depth of about 4 cm using a water tank truck, a Boots & Coots Model 70 eductor, and a foam nozzle. The fluid foam gelled in about 40 seconds. Twenty-four hours after placement of the foam, the hydrocarbon emission flux above the surface of the foam was measured and a canister sample of the emissions analyzed by gas chromatography using multiple detectors (flame ionization, photoionization, and Hall electrolytic conductivity). By comparison with the base-line emissions, it was found that over 99% of the organic vapors had been suppressed by the gelled foam. After 6 days, emissions were again monitored using field equipment which indicated 99% suppression of emissions. To verify that volatiles were still emitted from the test area soil, gelled foam (now in the form of a thin membrane) was removed from a portion of the surface of the foam-treated soil, and the so-exposed soil was again monitored for emissions. More than 90% of the original base-line emission flux of hydrocarbon vapors was still present.

EXAMPLES 9–18 and C10–C15

In these examples, various polyamines were reacted with prepolymer solutions at various equivalent ratios of amine to prepolymer and gel times and gel quality were determined.

Procedure used: In each example, in a 60 cc bottle was placed 23 g of an aqueous solution containing the polyamine, 2.0 g of Prepolymer Solution A (contains 1 g of Prepolymer A, equivalent wt. of 1890) was then added, then the mixture was quickly stirred and the gel time and gel quality were noted. Comparative examples were also run in the same way but using as the prepolymer solution a toluene diisocyanate-terminated prepolymer solution. And other comparative examples were run using a prepolymer solution but no polyamine. Results are given in TABLE 3.

The results show that approximately stoichiometric equivalent ratios of the aliphatic isocyanate-terminated prepolymers of this invention and polyamines are necessary to achieve useful gel times and gel quality. And the results also show that approximately stoichiometric ratios of aromatic isocyanate-terminated prepolymers and polyamines produce instantaneous gelation and syneresis, both of which properties are undesirable.

supra) in CARBITOL acetate, this solution hereinafter referred to as "Comparative Prepolymer Solution". The results of this evaluation are shown in TABLE 4. These results show that Prepolymer Solution A' has very low moisture sensitivity. Aqueous air foams could still be prepared from Prepolymer Solution A' after

TABLE 3

| Ex. | Ratio of equivalents, polyamine:prepolymer | Gel time (seconds)/Gel quality* 1:4 | 1:2 | 1:1 | 2:1 | 4:1 |
|---|---|---|---|---|---|---|
| | Reactants used in invention examples: (1) Prepolymer Solution A (2) Polyamine (Eq. wt.): | | | | | |
| 9 | $H_2NC_2H_4NHC_2H_4NH_2$ (34) | 900/S | 15/H | 35/S | N | |
| 10 | $H_2N(C_2H_4NH)_2C_2H_4NH_2$ (35.5) | T | 48/M | 7/H | N | |
| 11 | $H_2N(C_2H_4NH)_3C_2H_4NH_2$ (37.8) | T | 22/M | 7/H | 15/S | |
| 12 | $H_2N(C_2H_4O)_2C_2H_4NH_2$ (74)$^a$ | N | 190/S | N | | |
| 13 | $H_2N(CH_2)_6NH_2$ (58) | N | 23/S | 5/T | | |
| 14 | 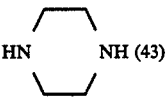 HN   NH (43) | N | 38/M | N | | |
| 15 | $H_2NCH(CH_3)CH_2[OCH_2CH(CH_3)]_{2-3}NH_2$ (115)$^b$ | N | N | N | | |
| 16 | $R[[CH_2CH(CH_3)O]_{1-2}[CH_2CH(CH_3)NH_2]]_3$ (134)$^d$ | N | 33/M | 52/T | | |
| 17 | $N(C_2H_4NH_2)_3$ (48.7)$^e$ | 15/S | 5/H | 5/sy | | |
| 18 | $H_2N(C_2H_4NH)_{1200}H$ (43)$^f$ | - | N | N | 15/M | 4/H |
| C10 | No polyamine used$^g$ | | | | | |
| | Reactants used in comparison examples: (1) Comparative Prepolymer Solution** (2) Polyamine (Eq. wt.): | | | | | |
| C11 | $H_2NC_2H_4NHC_2H_4NH_2$ (34) | 48/M | <1/sy | <1/sy | <1/sy | |
| C12 | $H_2N(CH_2)_6NH_2$ (58) | 80/S | <1/sy | <1/sy | <1/sy | |
| C13 |  HN   NH (43) | 48/M | 13/M | <1/sy | <1/sy | |
| C14 | $H_2NCH(CH_3)CH_2[OCH(CH_3)CH_2]_{3.5}$-$(OC_2H_4)_{3.5}NH_2$ (300)$^c$ | 63/M | 35/M | <1/sy | <1/sy | |
| C15 | No polyamine used$^g$ | | | | | |

*Gel quality: S = soft, M = medium, H = hard (firm), T = thickened (viscosity increase, no gel), N = no gel or thickening, sy = syneresis (gelling with loss of water from the gel)
**The prepolymer of this solution was prepared as described in Examples 2–13 of EP 0206548 A2 (supra) and had an equivalent weight of 1700. The prepolymer solution was prepared by dissolving the prepolymer in CARBITOL acetate to make a 50 wt. % solution.
$^a$JEFFAMINE EDR-148
$^b$JEFFAMINE D-230
$^c$JEFFAMINE ED-600
$^d$JEFFAMINE T-403
$^e$TREN (W. R. Grace)
$^f$ALDRICH Cat. No. 18,197-8
$^g$No gel or thickening occurred.
$^h$Gelation occurred in 63 sec. to give a hard or firm gel.

EXAMPLES 19 and C16

This example illustrates the low moisture sensitivity of aliphatic isocyanate-terminated prepolymers of this invention compared with aromatic isocyanate-terminated prepolymers.

Procedure used: Twenty grams of a 70 wt. % solution (hereinafter referred to as "Prepolymer Solution A'") of isophorone diisocyanate-terminated prepolymer in CARBITOL acetate ("Prepolymer A"—see EXAMPLES 1–6 for preparation), was poured into a plastic Petri dish cover (9 cm diameter, 0.6 cm height) and allowed to stand exposed to ambient laboratory air (about 22° C., 35–40% R.H.). Changes in viscosity of the Prepolymer A solution were thereafter observed over a period of several days by probing the solution with a spatula. In a comparative example, a similar evaluation was conducted on twenty grams of a 70 wt. % solution of a toluene diisocyanate-terminated prepolymer (described in comparison examples C11–C15, exposure to ambient laboratory air for a week. By comparison, the Comparative Prepolymer Solution readily reacted with the moisture in the air and was no longer useable after several hours.

TABLE 4

| | Viscosity of prepolymer solutions | |
|---|---|---|
| Elapsed time after pouring in dish cover | Ex. 19, Prepolymer Solution A' | Ex. C16, Comparative Prepolymer Solution |
| 5 hours | no change | thickened and skinned over |
| 1 day | no change | completely gelled |
| 2 days | no change | |
| 5 days | slight viscosity increase | |
| 8 days | moderate viscosity increase | |

TABLE 4-continued

| | Viscosity of prepolymer solutions | |
|---|---|---|
| Elapsed time after pouring in dish cover | Ex. 19, Prepolymer Solution A' | Ex. C16, Comparative Prepolymer Solution |
| 12 days | very viscous | |

EXAMPLES 20 and C17

This example further illustrates the low water sensitivity of aliphatic isocyanate-terminated prepolymer of this invention compared with aromatic isocyanate-terminated prepolymers.

Procedure used: Prepolymer Solution A' and Comparative Prepolymer Solution, described in EXAMPLES 19 and C16, were mixed in various proportions (by volume) with room temperature tap water and time for gelation of the homogeneous solutions observed. The results are shown in TABLE 5.

TABLE 5

| | Time to gelation | |
|---|---|---|
| Prepolymer:water ratio (by vol.) | Ex. 20, Prepolymer Solution A' | Ex. C17, Comparative Prepolymer Solution |
| 6:94 | >24 hours* | 70 seconds |
| 12:88 | >24 hours* | 50 seconds |
| 25:75 | 60 minutes | 45 seconds |
| 50:50 | 20 minutes | 65 seconds |
| 75:25 | 60 minutes | 165 seconds |
| 88:12 | ca. 8 hours | 420 seconds |

*These dilute aqueous Prepolymer Solutions A' lost isocyanate reactivity after about 1 hour.

EXAMPLES 21, 22 and C18–C21

For the compositions of EXAMPLES 21 and 22, synthetic sea water and polyamine were added to a 50 cc glass bottle, followed by the Prepolymer Solution A, supra. The contents of the bottles were stirred well to mix the reactants, and the gel quality of the resultant gelled aqueous composition was observed. Comparative Examples (C18–C21) using an aromatic isocyanate-terminated prepolymer solution, i.e., the Comparative Prepolymer Solution of comparision Examples C11–C15, supra, were also run. The results, shown in TABLE 6, illustrate that the hydrophilic polyurea compositions of this invention have very good resistance to syneresis when prepared using a synthetic sea water, compared with the polyurea prepared from the Comparative Prepolymer Solution.

TABLE 6

| | EXAMPLES | | | | | |
|---|---|---|---|---|---|---|
| | C18 | C19 | 21 | C20 | C21 | 22 |
| Composition, g: | | | | | | |
| Comparative Prepolymer Soln. | 2.0 | 2.0 | | 3.0 | 3.0 | |
| Prepolymer Soln. A | | | 2.0 | | | 3.0 |
| Syn. sea water* | 23 | 23 | 23 | 22 | 22 | 22 |
| Diethylene-triamine | | 0.013 | 0.013 | | 0.019 | 0.019 |
| Approx. percent liquid separating from gel due to syneresis | 55 | 70 | 5 | 55 | 60 | 0 |

*Water containing 4.2 weight % of ASTM D1141-52 Sea-Salt (available from Lake Products Co.). The composition of the sea salt (wt. %): sodium chloride (58.5), magnesium chloride hexahydrate (26.5), sodium sulfate (9.8), calcium chloride (2.8), potassium chloride (1.6), sodium bicarbonate (0.5), potassium bromide (0.2), boric acid (<0.1), strontium chloride hexahydrate (<0.1), sodium fluoride (<0.1).

EXAMPLES 23–26 and C22–C25

These examples show the improved resistance of the hydrophilic polyurea polymers of this invention to syneresis when prepared using warm water, compared with polyureas prepared from aromatic isocyanate-terminated prepolymer, thus allowing the prepolymer solution of this invention to be used conveniently under field conditions to make the polyurea products therefrom.

For the compositions of EXAMPLES 23–26, 23 g of tap water and 0.015 g of diethylenetriamine were placed in a 50 cc glass bottle, and the bottle and contents brought to the desired elevated temperature by placing in a hot water bath. Prepolymer Solution A (2.0 g) was then added and the bottles stirred well to mix the reactants. Gel time of the solution was recorded as well as the degree of syneresis of the gel. Comparative Examples (C22–C25) using (2.0 g) of an aromatic isocyanate-terminated prepolymer (Comparative Prepolymer Solution of comparison Examples C11–C15, supra) (reacting with 23.0 g tap water) were also run. The results are shown in TABLE 7.

TABLE 7

| Ex. No. | Water temp., °C. | Gel time, seconds | Degree of syneresis |
|---|---|---|---|
| 23 | 20 | 72 | none |
| C22 | 20 | 47 | none |
| 24 | 25 | 48 | none |
| C23 | 25 | 58 | low |
| 25 | 30 | 36 | none |
| C24 | 30 | 30 | high |
| 26 | 35 | 18 | high |
| C25 | 35 | 21 | high |

EXAMPLE 27

This example illustrates the use of an aliphatic isocyanate-terminated prepolymer of this invention in soil (sand) consolidation and sealing.

Porcedure used: About 200 cc of clean, dry sand were placed in a 400 mL plastic beaker. To a solution of water and diethylenetriamine was added Prepolymer Solution A, the resulting solution was quickly mixed an poured into the beaker containing the sand. Depth of penetration of the solution into the sand and gel time of the prepolymer solution were noted. The results are shown in TABLE 8.

TABLE 8

| | Run 1 | Run 2 |
|---|---|---|
| Composition: | | |
| Prepolymer Soln. A, mL | 20 | 20 |
| Diethylenetriamine, g | 0.075 | 0.150 |
| Water, mL | 150 | 150 |
| Depth of penetration | 100 % | 50% |
| Gel time | about 5 min. | 10 seconds |
| Quality of consolidation | firm, no | very firm |

EXAMPLES 28 and C26

This example illustrates the excellent physical properties of the aqueous air foams of this invention prepared from an aliphatic isocyanate-terminated prepolymer and a polyamine.

Procedure used: An aqueous solution of the reactants was prepared in a beaker using a surfactant solution, polyamine, and prepolymer solution. Immediately after adding the prepolymer solution, the final aqueous solution was placed in a mixing bowl of a Hobart N-50 food mixer equipped with a wire wisk (stirrer) and stirred for 15 seconds at a No. 3 setting. The fluid foam product was quickly poured into a 36 cm×28 cm×3 cm degreased aluminum tray containing a 2 cm layer of vermiculite. A comparative aqueous air foam, based on the water reaction of an aromatic isocyanate-terminated prepolymer, was prepared in the same manner and poured into a vermiculite-containing tray prepared as described above. Gelation times, initial foam appearance, physical characteristics, and changes in appearance and physical properties over a period of 3 days were observed. The results are shown in TABLE 9.

TABLE 9

|  | EXAMPLES | |
|---|---|---|
|  | C26 | 28 |
| Composition, g: | | |
| Prepolymer Solution A | | 16 |
| Compar. Prepolymer Solution[a] | 16 | |
| Surfactant solution[b] | 2 | 2 |
| Diethylenetriamine | 0.08 | |
| Water | 182 | 182 |
| Foam properties: | | |
| Foam expansion (approx.) | 15 | 12 |
| Time to gelation, seconds | 180 | 60[c] |
| Appearance and physical properties: | | |
| Initial | White, continuous foam layer, ca. 7 cm thick | White continuous foam layer, ca. 5 cm thick |
| After 1 day | Collapsed to translucent membrane, ca. 2 mm thick | Tough, white and nearly opaque, continuous foam layer, ca. 1 cm thick |
| After 3 days | Remained collapsed, tan, <1 mm thick | Tough, white, opaque, continuous foam layer |

[a]See comparison Examples C11-C15, supra.
[b]See footnote b., TABLE 1.
[c]In a run like this ExAMPLE 28, addition of 0.08 g of triethylenediamine (DABCO) tertiary amine catalyst to the composition did not change the gel time or physical properties of the foam.

EXAMPLES 29–42

These examples illustrate the preparation of a wide variety of useful aliphatic isocyanate-terminated prepolymers from reaction of various aliphatic diisocyanates and various poly(oxyalkylene) polyols, and the reaction of these prepolymers in aqueous solution with several polyamines to prepare aqueous air foams of this invention.

The prepolymers were prepared following the procedure of EXAMPLES 1–6, which was used in the preparation of Prepolymer A. The prepolymers thus prepared were diluted with CARBITOL acetate solvent to yield 50 wt. % solutions used in these examples. These prepolymer solutions and reactants used in their preparation are shown in TABLE 10.

TABLE 10

|  |  | Reactants | |
|---|---|---|---|
| Ex. No. | Prepolymer | Isocyanate | Polyol |
| 29 | C | TMXDI[a] | THANOL 4070 |
| 30 | D | TMHMDI[b] | THANOL 4070 |
| 31 | E | IPDI[c] | UCON 50H2500[e] |
| 32 | F | IPDI | UCON Tetraol[f] |
| 33 | G | HYLENE W[d] | THANOL 4070 |

[a]1,3-bis[(dimethylisocyanato)methyl]benzene
[b]1,6-diisocyanato-2,4,4-trimethylhexane
[c]Isophorone diisocyanate
[d]Methylenebis(4-cyclohexylisocyanate)
[e]Poly(oxyethylene-co-oxypropylene) diol containing 50% oxyethylene units, 4,000 mol. wt.
[f]Experimental 5,000 mol. wt. poly(oxyethylene-co-oxypropylene) tetraol, containing 75% oxyethylene units Foams were prepared by shaking vigorously, in a 120 cc glass bottle, prepolymer-surfactant solution and water. Foam expansion value was 3 to 4. Compositions and gel times are shown in TABLE 11.

TABLE 11

|  | EXAMPLES | | | | | | | | |
|---|---|---|---|---|---|---|---|---|---|
|  | 34 | 35 | 36 | 37 | 38 | 39 | 40 | 41 | 42 |
| Composition, g: | | | | | | | | | |
| Prepolymer[a]: | | | | | | | | | |
| Prepolymer C | 2 | | | | | | | | |
| Prepolymer D | | 2 | | | | | | | |
| Prepolymer E | | | 2 | 2 | | | 2 | | |
| Prepolymer F | | | | | 2 | | | | |
| Prepolymer G | | | | | | 2 | 2 | | |
| Prepolymer A | | | | | | | | | 2 |
| Polyamine: | | | | | | | | | |
| Diethylenetriamine | .015 | .015 | .015 | | .015 | .015 | .005 | | .015 |
| Tris(2-aminoethyl)amine | | | | .015 | | | | | |
| Poly(ethyleneimine)[b] | | | | | | | | .015 | |
| Surfactant solution[c] | .25 | .25 | .25 | .25 | .25 | .25 | .25 | .25 | .25 |
| Water | 22.7 | 22.7 | 22.7 | 22.7 | 22.7 | 22.7 | 22.7 | 22.7 | 22.7 |

TABLE 11-continued

| | EXAMPLES | | | | | | | | |
|---|---|---|---|---|---|---|---|---|---|
| | 34 | 35 | 36 | 37 | 38 | 39 | 40 | 41 | 42 |
| Gel time, seconds | 46 | 8 | d. | d. | 105 | 450 | d. | d. | 58 |

<sup>a</sup>50% solutions in CARBITOL acetate
<sup>b</sup>50,000 mol. wt.
<sup>c</sup>See footnote (b), TABLE 1
<sup>d</sup>Viscosity increase, no gelation

EXAMPLE 43

This example illustrates the use of a monofunctional amine chain-terminating agent in an aqueous foam composition of this invention to decrease crosslinking of the prepolymer, and thus yield a viscous foam instead of a gelled foam.

In a 120 cc glass bottle was placed 0.25 g surfactant solution (see footnote b, TABLE 1), 0.010 g of diethylenetriamine, 0.005 g methylamine, 22.7 ml water and 2.0 g of Prepolymer Solution A. The mixture was shaken vigorously and allowed to stand at room temperature. A viscous foam with very slow liquid drainage was obtained.

Various modifications and alterations of this invention will become apparent to those skilled in the art without departing from the scope and spirit of this invention.

What is claimed is:

1. A solution comprising polyamine reactant, low moisture sensitive poly(oxyalkylene) poly(aliphatic isocyanate) prepolymer the oxyalkylene portion of which contains sufficient oxyethylene units to render the prepolymer hydrophilic and water-soluble, and a water-soluble or -dispersible organic solvent which is free of active hydrogen atoms and in which said prepolymer is dissolved, the isocyanate moieties of said prepolymer being reactive with said polyamine.

2. An aqeuous solution comprising the solution of claim 1 and water as the major component of the aqueous solution.

3. The solution of claim 1 wherein said prepolymer is represented by the formula $$Y_1[(RO)_o\text{—}Y_2(NCO)_p]_z$$

where $Y_1$ is an active hydrogen atom-free residue of an organic compound having a plurality of active hydrogen atoms, $(RO)_o$ is a hydrophilic poly(oxyalkylene) chain having sufficient oxyethylene units to render said prepolymer hydrophilic and water-soluble, o is the number of oxyalkylene units in said chain, $Y_2$ is an organic linkage having an aliphatic portion to which the depicted isocyanate moieties are bonded, p is 1 to 5, and z is the number of said active hydrogen atoms in said compound.

4. The solution of claim 1 wherein said prepolymer is obtained as the reaction product of a poly(oxyethylene-co-oxypropylene)polyol and isophorone diisocyanate.

5. An aqueous, fluid air foam the liquid phase of which comprises surfactant, polyamine reactant, low moisture sensitive poly(oxyalkylene) poly(aliphatic isocyanate) prepolymer the oxyalkylene portion of which contains sufficient oxyethylene units to render the polymer hydrophilic and water-soluble, water as the major component of said foam by weight, and air as the major component of said foam by volume, the isocyanate moieties of said prepolymer being reactive with said polyamine in the presence of said water to form a poly(oxyalkylene) polyurea polymer dispersed in said water and containing one or more polyurylene-containing segments formed from said polyamine and prepolymer.

6. An air foam according to claim 5, wherein said prepolymer is represented by the formula:

$$Y_1[(RO)_o\text{—}Y_2(NCO)_p]_z$$

where $Y_1$ is an active hydrogen atom-free residue of an organic compound having a plurality of active hydrogen atoms, $(RO)_o$ is a hydrophilic poly(oxyalkylene) chain having sufficient oxyethylene units to render said prepolymer hydrophilic and water-soluble, o is the number of oxyalkylene units in said chain, $Y_2$ is an organic linkage having an aliphatic portion to which the depicted isocyanate moieties are bonded, p is 1 to 5, and z is the number of said active hydrogen atoms in said compound.

7. An air foam according to claim 5 wherein said prepolymer is represented by the formula $$Y_1[(CH_2CH_2O)_o\text{—}C(O)NH\text{—}R'(NCO)_p]_z$$

where $Y_1$ is an active hydrogen atom-free residue of an organic compound having a plurality of active hydrogen atoms, R' is an organic residue of polyisocyanate having an aliphatic portion to which the depicted isocyanate moieties are bonded, o is the number of oxyethylene units shown in the formula, which number is sufficient to render said polymer hydrophilic and water-soluble, p is 1 to 3, and z is 2 to 4.

8. An air foam according to claim 5 wherein said prepolymer is represented by the formula $$Y_1[(CH_2CH_2O)_a(CH_2\overset{\overset{\displaystyle CH_3}{|}}{C}HO)_b(CH_2CH_2O)_c\text{—}C(O)NH\text{—}R'\text{—}NCO]_z$$

where $Y_1$ is an active hydrogen atom-free residue of an organic compound having a plurality of active hydrogen atoms, R' is an organic residue of a polyisocyanate having an aliphatic portion to which the depicted isocyanate moieties are bonded, z is 2 to 4, and a, b, and c are integers such that the ratio $(a+c)/b$ is greater than 1 and the polymer is thus hydrophilic and water-soluble.

9. An air foam according to claim 5 wherein said prepolymer is represented by the formula $$Y_1[[(CH_2CH_2O)_x(CH_2\overset{\overset{\displaystyle CH_3}{|}}{C}HO)_y]\text{—}C(O)NH\text{—}R'\text{—}NCO]_z$$

where $Y_1$ is an active hydrogen atom-free residue of an organic compound having a plurality of active hydrogen atoms, R' is an organic residue of a polyisocyanate having an aliphatic portion to which the depicted isocyanate moieties are bonded, z is 2 to 4, and x and y are integers such that the ratio $x/y$ is greater than 1 and the polymer is thus water-soluble and hydrophilic, the CH$_2$CH$_2$O and

units being randomly distributed within the brackets enclosing said units.

10. An air foam according to claim 7, 8, or 9, wherein said organic residue is an aliphatic residue derived from isophorone diisocyanate and said polyamine is diethylenetriamine.

11. An air foam according to claim 5 wherein said surfactant is selected from nonionic, cationic, anionic, and amphoteric surfactants, and compatible mixtures thereof.

12. An air foam according to claim 5 wherein said surfactant is fluoroaliphatic surfactant or fluorine-free surfactant.

13. An air foam according to claim 5 wherein said surfactant is a combination of fluoroaliphatic surfactant and fluorine-free surfactant.

14. An air foam according to claim 5 having a density less than 1 g/cc.

15. An air foam according to claim 12 wherein said fluoroaliphatic surfactant is represented by the formula

wherein $R_f$ is a fluorinated, saturated, monovalent organic radical having a terminal perfluoromethyl group, containing from 3 to 20 carbon atoms, in which the carbon atoms of the chain are substituted only by fluorine, chlorine or hydrogen atoms with no more than one hydrogen or chlorine atom for every two carbon atoms, and in which a divalent oxygen or trivalent nitrogen atom, bonded only to carbon atoms, can be present in a skeletal chain, n is 1 or 2, Q is a multivalent linking group, m is an integer from 0 to 2, and Z is a water-solubilizing polar group, and said fluorine-free surfactant is water-soluble to at least about 0.02 percent by weight in water at 20° C. and which substantially completely emulsifies at least one phase of a mixture of equal volumes of cyclohexane and water at a concentration of about 0.1 to about 10 percent by weight of the water.

16. An air foam according to claim 5 wherein said surfactant foaming agent comprises sodium decyl sulfate and N,N-dimethyldodecylamine oxide, and said polymer is represented by the formula

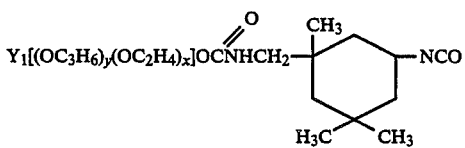

where x and y are integers such that the ratio x/y is greater than 1 and thus the prepolymer is water-soluble and hydrophilic, the OCH$_2$CH$_2$ and

units being randomly distributed within the brackets enclosing said units, and Y$_1$ is an active hydrogen atom-free residue of a trihydroxyalkane or glycerol.

17. A gelled two-phase, aqueous air foam comprising a discontinuous air phase which is the major component of said foam by volume and a continuous, aqueous, polymer hydrogel phase comprising, as the major component of said foam by weight, water in which poly(oxyalkylene) polyurea polymer is dispersed, said polymer being the product of reaction in said water of a polyamine reactant and low moisture sensitive poly(oxyalkylene) poly(aliphatic isocyanate) prepolymer, the oxyalkylene portion of which prepolymer contains sufficient oxyethylene units to render said prepolymer and said polymer hydrophilic, said polyurea polymer containing one or more polyurylene-containing segments formed from said polyamine and prepolymer.

18. A gelled air foam according to claim 17 wherein said prepolymer is represented by the formula:

where Y$_1$ is an active hydrogen atom-free residue of an organic compound having a plurality of active hydrogen atoms, (RO)$_o$ is a hydrophilic poly(oxyalkylene) chain having such oxyethylene units to render said prepolymer hydrophilic and water-soluble, o is the number of oxyalkylene units in said chain, Y$_2$ is an organic linkage having an aliphatic portion to which the depicted isocyanate moieties are bonded, p is 1 to 5, and z is the number of said active hydrogen atoms in said compound.

19. A gelled air foam according to claim 17 wherein said prepolymer is represented by the formula

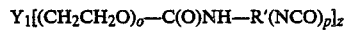

where Y$_1$ is an active hydrogen atom-free residue of an organic compound having a plurality of active hydrogen atoms, R' is an organic residue of a polyisocyanate having an aliphatic portion to which the depicted isocyanate moieties are bonded, o is the number of oxyethylene units shown in the formula, which number is sufficient to render said prepolymer hydrophilic and water-soluble, p is 1 to 3, and z is 2 to 4.

20. A gelled air foam according to claim 17 wherein said prepolymer is represented by the formula

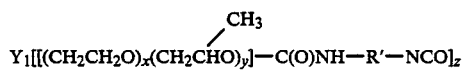

where Y$_1$ is an active hydrogen atom-free residue of an organic compound having a plurality of active hydrogen atoms, R' is an organic residue of a polyisocyanate having an aliphatic portion to which the depicted isocyanate moieties are bonded, z is 2 to 4, and x and y are integers such that the ratio x/y is greater than 1 and the polymer is thus water-soluble and hydrophilic, the CH$_2$CHO$_2$ and

units being randomly distributed within the brackets enclosing said units.

21. A gelled air foam according to claims 19 or 20, where said organic residue is an aliphatic residue derived from an isophorone diisocyanate, and said polyamine is diethylenetriamine.

22. A gelled air foam according to claim 17 wherein said prepolymer is represented by the formula

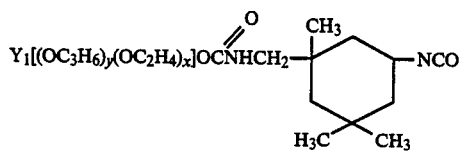

where x and y are integers such that the ratio x/y is greater than 1 and thus the prepolymer is water-soluble and hydrophilic, the OCH$_2$CH$_2$ and

units being randomly distributed within the brackets enclosing said units, and Y is an active hydrogen-free residue of a trihydroxyalkane.

23. A gelled air foam accoridng to claim 17 having a density less than 1 g/cc.

24. A viscous two-phase, aqueous air foam comprising a discontinuous air phase as the major component of said foam by volume and a continuous, viscous liquid phase comprising water, as the major component of said foam by weight, in which polyurea polymer is dispersed, said polymer being the product of reaction in said water of a polyamine reactant and low moisture sensitive poly(oxyalkylene) poly(aliphatic isocyanate) prepolymer, which prepolymer contains sufficient oxyethlene units to render said prepolymer hydrophilic, said polyurea polymer containing one or more polyurylene-containing segments formed from said polyamine and prepolymer.

25. An aqueous gelled solution comprising water, as the major component of said solution by weight, and poly(oxyalkylene) polyurea polymer, said polymer being the product of reaction in said water of a polyamine reactant and low moisture senstive poly(oxyalkyelene) poly(aliphatic isocyanate) prepolymer, the oxyalkylene portion of which prepolymer contains sufficient oxyethylene units to render said prepolymer and said polymer hydrophilic, said polyurea polymer containing one or more polyurylene-containing segments formed from said polyamine and prepolymer.

26. A viscous aqueous solution comprising waer, as the major component of said solution by weight, and poly(oxyalkylene) polyurea polymer, said polymer being the product of reaction in said water of a polyamine reactant and low moisture sensitive poly(oxyalkylene) poly(aliphatic isocyanate) prepolymer, the oxyalkylene portion of which prepolymer contains sufficient oxyethylene units to render said prepolymer and said polymer hydrophilic, said polyurea polymer containing one or more polyurylene-containing segments formed from said polyamine and prepolymer.

27. The method of making low moisture sensitive poly(oxyalkylene) poly(aliphatic isocyanate) prepolymer the poly(oxyalkylene) portion of which contains sufficient oxyethylene units to render the prepolymer water-soluble and hydrophilic, comprising reacting poly(oxyalkylene) polyol reactant with aliphatic polyisocyanate reactant in the presence of 10 to 100 parts of ferric acetonylacetonate catalyst per 1,000,000 parts of total reactants.

28. The method of claim 27 wherein said polyol is poly(oxyethylene-co-oxypropylene) polyol and said polyisocyanate is isophorone diisocyanate.

29. A method of treating a substrate which comprises applying to exposed surface thereof the fluid air foam of claim 5, and allowing the polyamine and prepolymer of said foam to react and form on said surface a gelled foam or a viscous foam comprising said polyurea polymer.

30. The method of claim 29 wherein said prepolymer is represented by the formula:

$$Y_1[(RO)_o\text{—}Y_2(NCO)_p]_z$$

where $Y_1$ is an active hydrogen atom-free residue of an organic compound having a plurality of active hydrogen atoms, $(RO)_o$ is a hydrophilic poly(oxyalkylene) chain having sufficient oxyethylene units to render said prepolymer hydrophilic and water-soluble, o is the number of oxyalkylene units in said chain, $Y_2$ is an organic linkage having an aliphatic portion to which the depicted isocyanate moieties are bonded, p is 1 to 5, and z is the number of said active hydrogen atoms in said compound.

31. The method of claim 29 wherein said substrate is that of a body of hazardous waste.

32. The method of claim 29 wherein said substrate is a body of flammable liquid.

33. The method of claim 29 wherein said substrate is a body of combustible material.

34. The method of claim 29 wherein said substrate is a body of cementitious material.

35. A method of consolidating aggregate material, which method comprises contacting said aggregate material with an aqueous solution comprising polyamine reactant, poly(oxyalkylene) poly(aliphatic isocyanate) prepolymer the oxyalkylene portion of which contains sufficient oxyethylene units to render the prepolymer hydrophilic and water-soluble, and water as the major component of said solution by weight, and allowing said polyamine and prepolymer to react in the presence of said water and form polyurea polymer which consolidates said aggregate material, said polyurea polymer containing one or more polyurylene-containing segments formed from said polyamine and prepolymer.

36. A method of sealing a structure, which method comprises placing at the locus to be sealed an aqueous solution comprising polyamine reactant, poly(oxyalkylene) poly(aliphatic isocyanate prepolymer the oxyalkylene poriton of which contains sufficient oxyethylene units to render the prepolymer hydrophilic and water-soluble, and water as the major component of said solution by weight, and allowing said polyamine and prepolymer to react and form polyurea polymer seal at said locus, said polyurea polymer containing one or more polyurylene-containing segments formed from said polyamine and prepolymer.

37. An air foam according to claim 5 wherein the amount of polyamine reactant is about a stoichiometric equivalent amount to react with the available isocyante groups in the prepolymer reactant.

38. An air foam according to claim 5 wherein the $-NH-/-NCO$ equivalents ratio of the polyamine/prepolymer reactants is in the range of 4/1 to 1/4.

39. An air foam according to claim 7 wherein $-Y_2(-NCO)_p$ is $-OC(O)NH-R'(NCO)_p$ where R' is the organic residue of an aliphatic polyisocyanate and said polyurylene-containing segmetns formed from the reaction of the prepolymer and polyamine have the formula

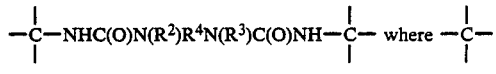

is part of R', $R^2$ and $R^3$ are H or $C_1$ to $C_4$ lower alkyl or $R^2$ and $R^3$ taken together form a ring, $R^4$ is an alkylene or aralkylene radical which can contain non-adjacent oxygen atoms or non-adajcent

groups where $R^5$ is H or $C_1$ to $C_5$ lower alkyl or

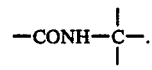

* * * * *

UNITED STATES PATENT AND TRADEMARK OFFICE
CERTIFICATE OF CORRECTION

PATENT NO. : 4,795,764

DATED : JANUARY 3, 1989

INVENTOR(S) : ROGER R. ALM, ET AL.

It is certified that error appears in the above-identified patent and that said Letters Patent is hereby corrected as shown below:

Col. 3, line 38, delete the comma after increase.

Col. 3, line 41, underline "per se".

Col. 3, line 63, delete "foam" and insert --foams--.

Col. 4, line 6, underline "in situ".

Col. 9, line 17, delete "-" after R and insert --'--.

Col. 9, line 36, delete "-".

Col. 31, lines 54-59, delete

"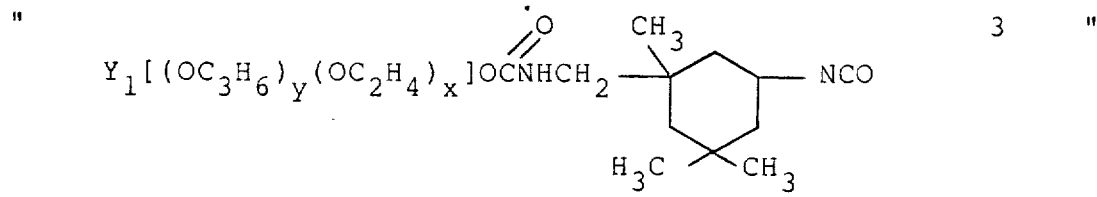 3 "

and substitute therefore

-- 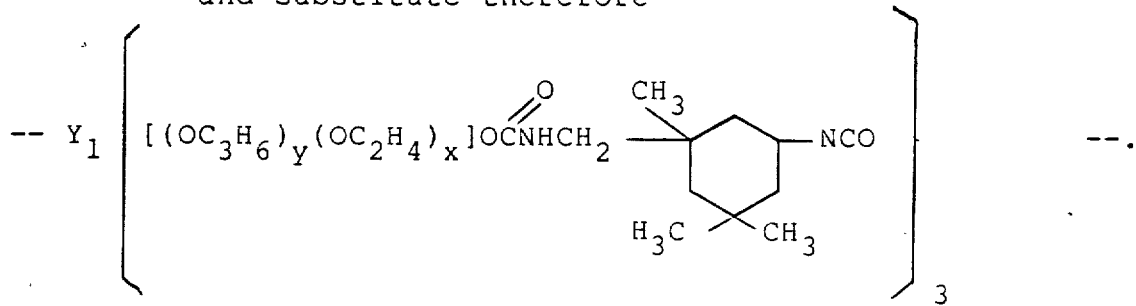 --.

UNITED STATES PATENT AND TRADEMARK OFFICE
CERTIFICATE OF CORRECTION

PATENT NO. : 4,795,764

DATED : JANUARY 3, 1989

INVENTOR(S) : ROGER R. ALM, ET AL.

It is certified that error appears in the above-identified patent and that said Letters Patent is hereby corrected as shown below:

Col. 32, lines 62-65, delete

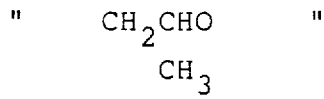

and substitute therefore

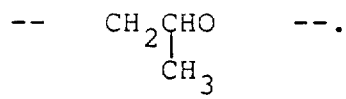

Col. 33, lines 8-13, delete

" 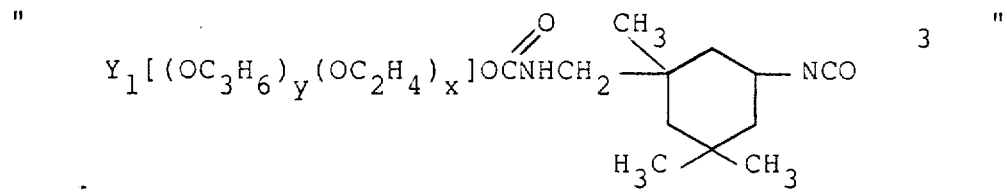 3 "

and substitute therefore

-- 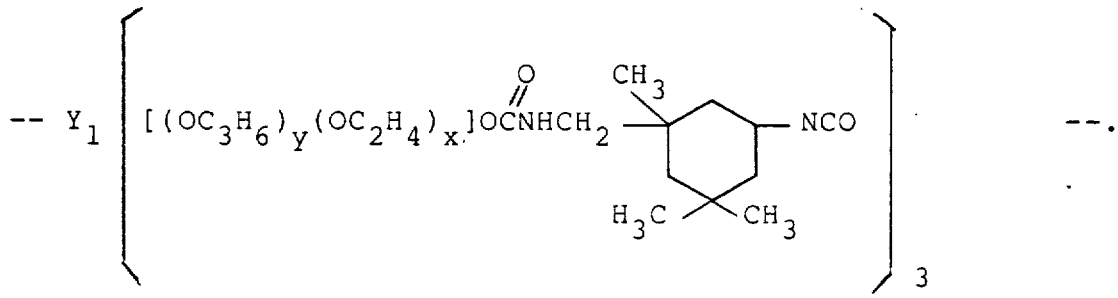 --.

UNITED STATES PATENT AND TRADEMARK OFFICE
CERTIFICATE OF CORRECTION

PATENT NO. : 4,795,764

DATED : JANUARY 3, 1989

INVENTOR(S) : ROGER R. ALM, ET AL.

It is certified that error appears in the above-identified patent and that said Letters Patent is hereby corrected as shown below:

Col. 33, line 23, delete "Y" and substitute -- $Y_1$ --.

Col. 33, line 51, delete "waer," and substitute --water,--.

Col. 34, line 54, after "isocyanate" insert --)--.

Col. 35, line 19, delete "segmetns" and insert --segments--.

Signed and Sealed this

Fourteenth Day of July, 1992

Attest:

DOUGLAS B. COMER

Attesting Officer

Acting Commissioner of Patents and Trademarks